United States Patent
Van der Auwera et al.

(10) Patent No.: US 11,611,757 B2
(45) Date of Patent: Mar. 21, 2023

(54) POSITION DEPENDENT INTRA PREDICTION COMBINATION EXTENDED WITH ANGULAR MODES

(71) Applicant: QUALCOMM Incorporated, San Diego, CA (US)

(72) Inventors: Geert Van der Auwera, Del Mar, CA (US); Vadim Seregin, San Diego, CA (US); Amir Said, San Diego, CA (US); Marta Karczewicz, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

(21) Appl. No.: 16/371,638

(22) Filed: Apr. 1, 2019

(65) Prior Publication Data
US 2019/0306513 A1    Oct. 3, 2019

Related U.S. Application Data

(60) Provisional application No. 62/651,424, filed on Apr. 2, 2018.

(51) Int. Cl.
*H04N 19/105*   (2014.01)
*H04N 19/139*   (2014.01)
*H04N 19/159*   (2014.01)
*H04N 19/176*   (2014.01)

(52) U.S. Cl.
CPC ......... *H04N 19/159* (2014.11); *H04N 19/105* (2014.11); *H04N 19/176* (2014.11); *H04N 19/139* (2014.11)

(58) Field of Classification Search
CPC .. H04N 19/105; H04N 19/139; H04N 19/159; H04N 19/176; H04N 19/11; H04N 19/593
See application file for complete search history.

(56) References Cited

U.S. PATENT DOCUMENTS

| | | | |
|---|---|---|---|
| 2006/0193388 A1* | 8/2006 | Woods | H04N 19/61 375/240.16 |
| 2013/0028530 A1* | 1/2013 | Drugeon | H04N 19/136 382/233 |
| 2013/0114696 A1* | 5/2013 | Liu | H04N 19/136 375/240.03 |

(Continued)

FOREIGN PATENT DOCUMENTS

| | | |
|---|---|---|
| RU | 2619706 C2 | 5/2017 |
| WO | 2017165391 A1 | 9/2017 |

(Continued)

OTHER PUBLICATIONS

International Search Report and Written Opinion—PCT/US2019/025376—ISA/EPO—dated May 23, 2019.

(Continued)

*Primary Examiner* — Anner N Holder
(74) *Attorney, Agent, or Firm* — Shumaker & Sieffert, P.A.

(57) ABSTRACT

Techniques are described of using Position Dependent Intra Prediction Combination (PDPC). A video coder such as a video encoder or a video decoder utilizes PDPC in cases where a current block intra mode predicted using an angular intra prediction mode.

45 Claims, 9 Drawing Sheets

(56) References Cited

U.S. PATENT DOCUMENTS

| | | | |
|---|---|---|---|
| 2013/0251039 A1* | 9/2013 | Drugeon | H04N 19/11 375/240.14 |
| 2017/0094285 A1 | 3/2017 | Said et al. | |
| 2017/0318305 A1* | 11/2017 | Kobayashi | H04L 12/14 |
| 2017/0347093 A1 | 11/2017 | Yu et al. | |
| 2017/0347102 A1* | 11/2017 | Panusopone | B60R 13/04 |
| 2017/0353730 A1* | 12/2017 | Liu | C23C 18/165 |
| 2018/0091825 A1* | 3/2018 | Zhao | H04N 19/593 |
| 2019/0166370 A1* | 5/2019 | Xiu | H04N 19/176 |
| 2019/0200011 A1* | 6/2019 | Yoo | H04N 19/176 |
| 2019/0208209 A1* | 7/2019 | Jang | H04N 19/176 |
| 2019/0306516 A1* | 10/2019 | Misra | H04N 19/11 |
| 2019/0373285 A1* | 12/2019 | Vanam | H04N 19/11 |
| 2020/0204814 A1* | 6/2020 | Yoo | H04N 19/105 |
| 2020/0260104 A1* | 8/2020 | Piao | H04N 19/159 |

FOREIGN PATENT DOCUMENTS

| | | |
|---|---|---|
| WO | 2017192995 A1 | 11/2017 |
| WO | 2017205701 A1 | 11/2017 |
| WO | 2018044142 A1 | 3/2018 |
| WO | 2018047995 A1 | 3/2018 |

OTHER PUBLICATIONS

Panusopone K., et al., "Unequal Weight Planar Prediction and Constrained PDPC" 5. JVET Meeting; Dec. 1, 2017-Jan. 20, 2017; Geneva; (The Joint Video Exploration Team of ISO/IEC JTC1/SC29/WG11 and ITU-T SG.16); URL: http://phenix.int-evry.fr/jvet/doc_end_user/current_document.php?id=2955 No. JVET-E0068, Jan. 5, 2017 (Jan. 5, 2017), pp. 1-6, XP030150550, pp. 3, 4, Paragraph 3.

ITU-T H.265, "Series H: Audiovisual and Multimedia Systems, Infrastructure of audiovisual services—Coding of moving video. High efficiency video coding," The International Telecommunication Union. Dec. 2016, 664 pp.

Wang Y-K., et al., "High Efficiency Video Coding (HEVC) Defect Report," Joint Collaborative Team on Video Coding (JCT- VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.

Zhao X., et al., "EE1 Related: Simplification and Extension of PDPC", 8. JVET Meeting, Oct. 18, 2017-Oct. 25, 2017, MACAU, (The Joint Video Exploration Team of ISO/IEC JTC1/SC29/WG11 and ITU-T SG.16 ), URL:http://PHENIX.INT-EVRY.FR/JVET/,,No. JVET-H0057-v3, Oct. 18, 2017 (Oct. 18, 2017), XP030151050, pp. 1-3.

Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 51 pp.

Van Der Auwera G., et al., "Extension of Simplified PDPC to Diagonal Intra Modes", 10. JVET Meeting, Oct. 4, 2018-Apr. 20, 2018, San Diego, (The Joint Video Exploration Team of ISO/IEC JTC1/SC29/WG11 and ITU-T SG.16), URL: http://PHENIX.INT-EVRY.FR/JVET/,,No. JVET-J0069,Apr. 3, 2018 (Apr. 3, 2018), XP030151261, pp. 1-4.

Van Der Auwera G., et al., "CE3: Simplified PDPC (Test 2.4.1)", Joint Video Experts Team (JVET) of ITU-T SG 16 WP 3 and ISO/IEC JTC 1/SC 29/WG 11, JVET-K0063-v2, 11th Meeting: Ljubljana, SI, Jul. 10-18, 2018, 6 pages.

Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Said A., et al., "Position Dependent Intra Prediction Combination", Qualcomm Incorporated, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 5 Pages.

Geert Van der Auwera et al., "Extension of Simplified PDPC to Diagonal Intra Modes," JVET of ITU-T SG 16 WP 3 and ISP/IEC JTC 1/SC 29/WG 11, Document: JVET-J0069 r1,10th Meeting: San Diego, USA, Apr. 10-20, 2018 (5 pp).

Geert Van der Auwera et al., "CE3: Simplified PDPC (Test 2.4.1),"0 JVET of ITU-T SG 16 WP 3 and ISO/IEC JTC 1/SC 29/WG 11, Document: JVET-K0063-V2, 11th Meeting: Ljubljana, SI, Jul. 10-18, 2018 (6 pp).

Panusopone K., et al., "Weighted Angular Prediction," Joint Video Exploration Team (JVET) of ITU-T SG16 WP3 and ISO/IEC JTC1/SC29/WG611, 6th Meeting, Hobart, AU, March 3-Apr. 7, 2017, JVET-F0104, 4 pages.

Taiwan Search Report—108111745—TIPO—dated Aug. 26, 2022 (1 page).

Said A., et al., "Position Dependent Prediction Combination for Intra-frame Video Coding", 2016 IEEE International Conference on Image Processing (ICIP), IEEE, Sep. 25, 2016 (Sep. 25, 2016), Phoenix, AZ, 2016, pp. 534-538, XP033016540, DOI: 10.1109/ICIP.2016.7532414 [retrieved on Aug. 3, 2016].

* cited by examiner

|  | Y | U | V |
|---|---|---|---|
| HD1 | -0.32% | -0.15% | -0.27% |
| UHD2A | -0.31% | -0.24% | -0.17% |
| UHD2B | -0.43% | -0.17% | -0.17% |
| HD2 | -0.26% | -0.16% | -0.22% |
| Class C | -0.33% | -0.25% | -0.15% |
| Class D | -0.33% | -0.28% | -0.25% |
| Class E | -0.33% | -0.13% | -0.10% |
| Average 2 | -0.33% | -0.19% | -0.19% |
| Average CDE | -0.33% | -0.23% | -0.17% |

FIG. 5A

|  | Y | U | V |
|---|---|---|---|
| HD1 | -0.09% | -0.01% | -0.05% |
| UHD2A | -0.16% | -0.05% | -0.03% |
| UHD2B | -0.19% | 0.00% | 0.06% |
| HD2 | -0.07% | 0.01% | -0.05% |
| Class C | -0.09% | -0.11% | 0.14% |
| Class D | -0.08% | -0.10% | 0.12% |
| Class E | -0.12% | 0.11% | 0.17% |
| Average 2 | -0.14% | -0.01% | -0.01% |
| Average CDE | -0.10% | -0.05% | 0.14% |

FIG. 5B

POSITION DEPENDENT INTRA PREDICTION COMBINATION EXTENDED WITH ANGULAR MODES

This application claims the benefit of U.S. Provisional Application No. 62/651,424, filed Apr. 2, 2018, the entire contents of which are incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, CUs, and/or coding nodes. Pictures may be referred to as frames. Reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

This disclosure describes techniques for coding a block of video data using intra prediction. For example, the techniques of this disclosure include coding a block of video data using a position dependent intra prediction combination (PDPC) extended to be used with an angular intra prediction mode (e.g., diagonal intra prediction mode or angular intra prediction modes adjacent to the diagonal intra prediction mode). In intra prediction, a prediction block is generated for a current block based on neighboring pixels to the current block. In PDPC, the prediction samples within the prediction block are modified and the modified prediction samples are used to encode or decode the current block. For encoding, a video encoder uses the modified prediction samples to determine residual values that are signaled to a video decoder, and for decoding, a video decoder adds the modified prediction samples to the received residual values to reconstruct the current block.

PDPC techniques were limited to certain intra prediction modes, such as the DC, planar, vertical, and horizontal intra prediction modes. This disclosure describes example ways in which to extend PDPC techniques to angular intra prediction modes. For instance, in PDPC techniques, reference samples external to the current block are used to modify the prediction samples. There may be complexities in determining which reference samples to use when PDPC techniques are extended to angular intra prediction modes. This disclosure describes example ways in which to determine the reference samples to use and the way in which the reference samples and predicted samples are weighted to perform PDPC techniques for angular intra prediction modes, such as determining reference samples based on the angular intra prediction modes (e.g., based on the angles of the angular intra prediction modes).

In one example, the disclosure describes a method of decoding video data, the method comprising determining a prediction block, which includes a plurality of prediction samples, for a current block based on an angular intra prediction mode that is not a DC, planar, horizontal, or vertical intra prediction mode, modifying a prediction sample of the plurality of prediction samples of the prediction block to generate a modified prediction sample using Position Dependent Intra Prediction Combination (PDPC), wherein modifying the prediction sample comprises determining one or more reference samples that are external to the current block based on the angular intra prediction mode and modifying the prediction sample to generate the modified prediction sample based on the determined one or more reference samples, and reconstructing a sample of the current block based on the modified prediction sample and a residual value.

In one example, the disclosure describes a method of encoding video data, the method comprising determining a prediction block, which includes a plurality of prediction samples, for a current block based on an angular intra prediction mode that is not a DC, planar, horizontal, or vertical intra prediction mode, modifying a prediction sample of the plurality of prediction samples of the prediction block to generate a modified prediction sample using Position Dependent Intra Prediction Combination (PDPC), wherein modifying the prediction sample comprises determining one or more reference samples that are external to the current block based on the angular intra prediction mode and modifying the prediction sample to generate the modified prediction sample based on the determined one or more reference samples, determining a residual value for a residual block based on the modified prediction sample and a sample value in the current block, and signaling information indicative of the residual value.

In one example, the disclosure describes a device for decoding video data, the device comprising a memory configured to store a prediction block and a video decoder comprising at least one of fixed-function or programmable circuitry. The video decoder is configured to determine the prediction block, which includes a plurality of prediction samples, for a current block, for storage in the memory, based on an angular intra prediction mode that is not a DC, planar, horizontal, or vertical intra prediction mode, modify a prediction sample of the plurality of prediction samples of the prediction block to generate a modified prediction sample using Position Dependent Intra Prediction Combination (PDPC), wherein to modify the prediction sample, the video decoder is configured to determine one or more reference samples that are external to the current block based on the angular intra prediction mode and modify the prediction sample to generate the modified prediction sample based on the determined one or more reference samples, and reconstruct a sample of the current block based on the modified prediction sample and a residual value.

In one example, the disclosure describes a device for encoding video data, the device comprising a memory configured to store a prediction block and a video encoder comprising at least one of fixed-function or programmable circuitry. The video encoder is configured to determine the prediction block, which includes a plurality of prediction samples, for a current block, for storage in the memory, based on an angular intra prediction mode that is not a DC, planar, horizontal, or vertical intra prediction mode, modify a prediction sample of the plurality of prediction samples of the prediction block to generate a modified prediction sample using Position Dependent Intra Prediction Combination (PDPC), wherein to modify the prediction sample, the video encoder is configured to determine one or more reference samples that are external to the current block based on the angular intra prediction mode and modify the prediction sample to generate the modified prediction sample based on the determined one or more reference samples, determine a residual value for a residual block based on the modified prediction sample and a sample value in the current block, and signal information indicative of the residual value.

In one example, the disclosure describes a computer-readable storage medium storing instruction thereon that when executed cause one or more processors of a device for decoding video data to:

In one example, the disclosure describes a computer-readable storage medium storing instruction thereon that when executed cause one or more processors of a device for decoding video data to determine a prediction block, which includes a plurality of prediction samples, for a current block based on an angular intra prediction mode that is not a DC, planar, horizontal, or vertical intra prediction mode, modify a prediction sample of the plurality of prediction samples of the prediction block to generate a modified prediction sample using Position Dependent Intra Prediction Combination (PDPC), wherein the instructions that cause the one or more processors to modify the prediction sample comprise instructions that cause the one or more processors to determine one or more reference samples that are external to the current block based on the angular intra prediction mode and modify the prediction sample to generate the modified prediction sample based on the determined one or more reference samples, and reconstruct a sample of the current block based on the modified prediction sample and a residual value.

In one example, the disclosure describes a computer-readable storage medium storing instruction thereon that when executed cause one or more processors of a device for encoding video data to determine a prediction block, which includes a plurality of prediction samples, for a current block based on an angular intra prediction mode that is not a DC, planar, horizontal, or vertical intra prediction mode, modify a prediction sample of the plurality of prediction samples of the prediction block to generate a modified prediction sample using Position Dependent Intra Prediction Combination (PDPC), wherein the instructions that cause the one or more processors to modify the prediction sample comprise instructions that cause the one or more processors to determine one or more reference samples that are external to the current block based on the angular intra prediction mode and modify the prediction sample to generate the modified prediction sample based on the determined one or more reference samples, determine a residual value for a residual block based on the modified prediction sample and a sample value in the current block, and signal information indicative of the residual value.

In one example, the disclosure describes a device for decoding video data, the device comprising means for determining a prediction block, which includes a plurality of prediction samples, for a current block based on an angular intra prediction mode that is not a DC, planar, horizontal, or vertical intra prediction mode, means for modifying a prediction sample of the plurality of prediction samples in the prediction block to generate a modified prediction sample using Position Dependent Intra Prediction Combination (PDPC), wherein the means for modifying the prediction sample comprises means for determining one or more reference samples that are external to the current block based on the angular intra prediction mode and means for modifying the prediction sample to generate the modified prediction sample based on the determined one or more reference samples, and means for reconstructing a sample of the current block based on the modified prediction sample and a residual value.

In one example, the disclosure describes a device for encoding video data, the device comprising means for determining a prediction block, which includes a plurality of prediction samples, for a current block based on an angular intra prediction mode that is not a DC, planar, horizontal, or vertical intra prediction mode, means for modifying a prediction sample of the plurality of prediction samples of the prediction block to generate a modified prediction sample using Position Dependent Intra Prediction Combination (PDPC), wherein the means for modifying the prediction sample comprises means for determining one or more reference samples that are external to the current block based on the angular intra prediction mode and means for modifying the prediction sample to generate the modified prediction sample based on the determined one or more reference samples, means for determining a residual value for a residual block based on the modified prediction sample and a sample value in the current block, and means for signaling information indicative of the residual value.

The details of one or more examples are set forth in the accompanying drawings and the description below. Other features, objects, and advantages will be apparent from the description, drawings, and claims.

BRIEF DESCRIPTION OF DRAWINGS

FIG. 5A is a conceptual diagram illustrating an example of a Table 1 containing all-intra test condition BD-rates for PDPC extension excluding diagonal and adjacent mode boundary filtering.

FIG. 5B is a conceptual diagram illustrating an example of a Table 2 containing all-intra test condition BD-rates for PDPC extension including diagonal and adjacent mode boundary filtering.

DETAILED DESCRIPTION

This disclosure describes techniques for coding a block of video data using intra prediction, and more particularly, this disclosure describes techniques related to the use of intra prediction in a manner that uses a position dependent intra prediction combination (PDPC) approach, and more specifically, that uses a PDPC approach that extends such a PDPC approach to angular intra prediction modes (e.g., diagonal intra modes and angular modes that are adjacent to the diagonal intra modes). The techniques described herein introduce compression efficiency generally to coding a block of video data, and more particularly introduce compression efficiency to a PDPC approach by use of such techniques for angular intra prediction modes (e.g., diagonal intra modes and to angular modes that are adjacent to the diagonal intra modes), where compression efficiency is a generally desirable goal in advancing the state of existing video coding techniques and improving the performance of video coding processors and video codecs.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoders typically perform video decoding as part of the processes of determining how to encode video data. Thus, unless stated to the contrary, it should not be assumed that a technique described with respect to video decoding cannot also be performed as part of video encoding, or vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

Figure 1:
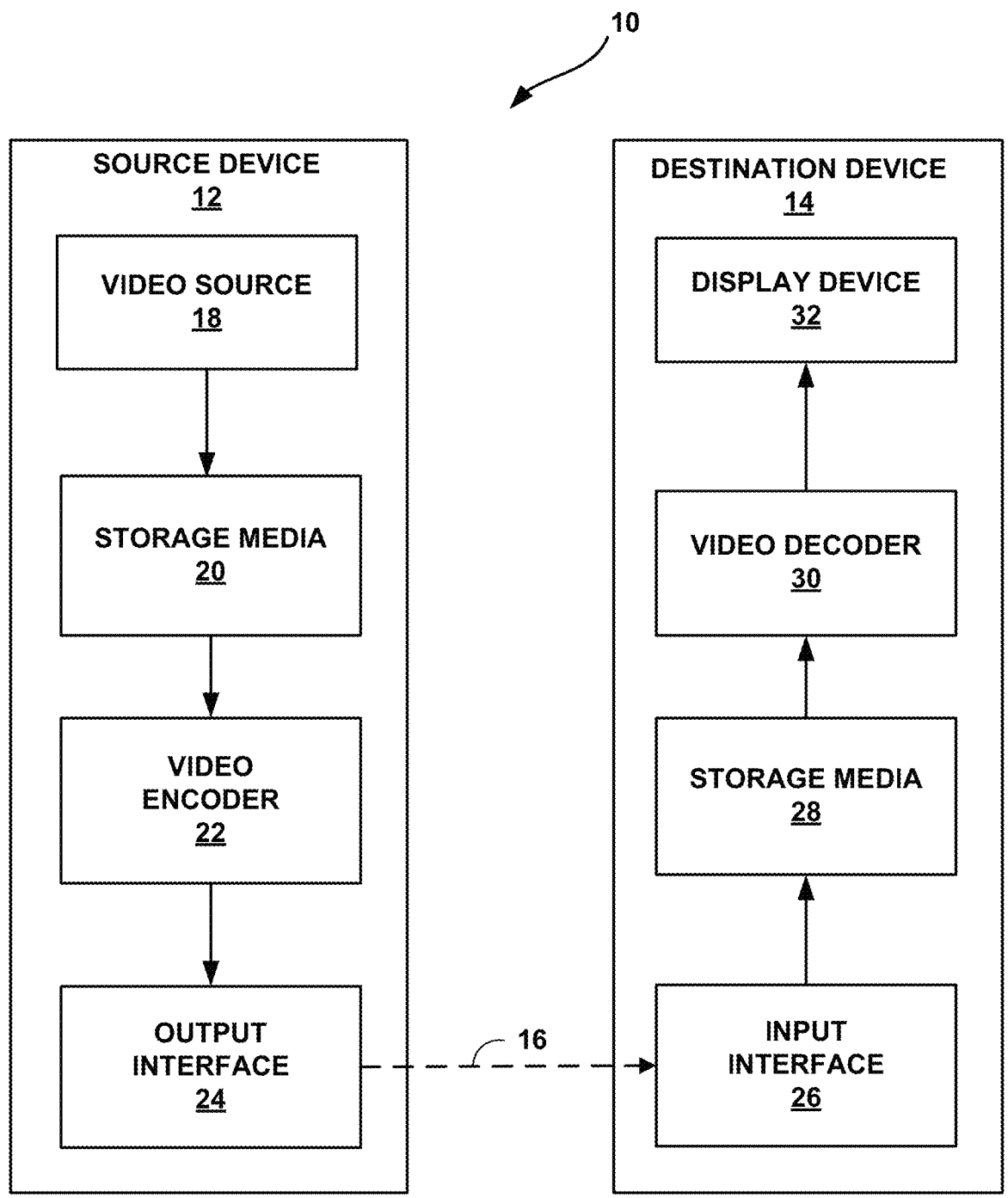
FIG. 1 is a block diagram illustrating an example video encoding and decoding system configured to implement techniques of the disclosure.

FIG. 1 is a block diagram illustrating an example video encoding and decoding system 10 that may utilize techniques of this disclosure for coding a block of video data using a PDPC approach, and more specifically, using a PDPC approach that extends such a PDPC approach to angular intra prediction mode (e.g., diagonal intra modes and to angular modes that are adjacent to the diagonal intra modes). As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (e.g., a device or apparatus for decoding video data).

In the example of FIG. 1, source device 12 includes a video source 18, storage media 20 configured to store video data, a video encoder 22, and an output interface 24. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device or apparatus. Although generally the techniques of this disclosure are performed by a video encoding device and a video decoding device, the techniques may also be performed by a combined video encoder/decoder, typically referred to as a "CODEC." Source device 12 and destination device 14 are merely examples of such coding devices in which source device 12 generates encoded video data for transmission to destination device 14. In some examples, source device 12 and destination device 14 operate in a substantially symmetrical manner such that each of source device 12 and destination device 14 includes video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information to computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data (e.g., encoded video data) may be output from output interface 24 to a storage device. Similarly, encoded data may be accessed from the storage device by input interface 26. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of multimedia applications, such as over-the-air television broadcasts, cable television transmissions, satellite television transmissions, Internet streaming video transmissions, such as adaptive streaming techniques including dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 of video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

Video encoder 22 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 22 and video decoder 30 may be included in one or more encoders or decoders, either of which may be integrated as part of a combined encoder/decoder (CODEC) in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. The video coding standard High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) of ITU-T Video Coding Experts Group (VCEG) and ISO/IEC Motion Picture Experts Group (MPEG). A HEVC draft specification, and referred to as HEVC WD hereinafter, is available from http://phenix.int-evry.fr/jct/doc_end_user/documents/14_Vienna/wg11/JCTVC-N1003-v1.zip.

Video encoder 22 and video decoder 30 may also operate in accordance with other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (WET) of ITU-T SG 16 WP 3 and ISO/IEC JTC 1/SC 29/WG 11, 13$^{th}$ Meeting: Marrakech, Mass., 9-18 Jan. 2019, WET-M1001-v5 (hereinafter "VVC Draft 4"). The techniques of this disclosure, however, are not limited to any particular coding standard.

In HEVC and VVC and other video coding specifications, a video sequence typically includes a series of pictures.

Pictures may also be referred to as "frames." A picture may include three sample arrays, denoted $S_L$, $S_{Cb}$, and $S_{Cr}$. $S_L$ is a two-dimensional array (i.e., a block) of luma samples. So is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Furthermore, in HEVC and other video coding specifications, to generate an encoded representation of a picture, video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

If operating according to HEVC, to generate a coded CTU, video encoder 22 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Syntax data within a bitstream may also define a size for the CTU. A slice includes a number of consecutive CTUs in coding order. A video frame or picture may be partitioned into one or more slices. As mentioned above, each tree block may be split into CUs according to a quad-tree. In general, a quad-tree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively and may depend on whether the CU is split into sub-CUs. If a CU is not split further, it is referred as a leaf-CU. If a block of CU is split further, it may be generally referred to as a non-leaf-CU. In some examples of this disclosure, four sub-CUs of a leaf-CU may be referred to as leaf-CUs even if there is no explicit splitting of the original leaf-CU. For example, if a CU at 16×16 size is not split further, the four 8×8 sub-CUs may also be referred to as leaf-CUs although the 16×16 CU was never split.

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a tree block may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node as well as prediction units (PUs) and transform units (TUs) associated with the coding node. A size of the CU corresponds to a size of the coding node and may be, in some examples, square in shape. In the example of HEVC, the size of the CU may range from 8×8 pixels up to the size of the tree block with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs. The TUs may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quad-tree structure, sometimes called a "residual quad tree" (RQT). The leaf nodes of the RQT may be referred to as TUs. Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a RQT, which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The TUs may be specified using an RQT (also referred to as a TU quad-tree structure), as discussed above. For example, a split flag may indicate whether a leaf-CU is split into four transform units. In some examples, each transform unit may be split further into further sub-TUs. When a TU is not split further, it may be referred to as a leaf-TU. Generally, for intra coding, all the leaf-TUs belonging to a leaf-CU contain residual data produced from the same intra prediction mode. That is, the same intra-prediction mode is generally applied to calculate predicted values that will be transformed in all TUs of a leaf-CU. For intra coding, video encoder 22 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective RQT structures. That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU).

As discussed above, video encoder 22 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 and video decoder 30 may be configured to operate according to VVC. According to VVC, a video coder (such as video encoder 22) partitions a picture into a plurality of coding tree units (CTUs). Video encoder 22 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quad-tree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quad-tree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 22 and video decoder 30 may use a single QTBT or MTT structure to represent each of the luminance and chrominance components, while in other examples, video encoder 22 and video decoder 30 may use two or more QTBT or MTT structures, such as one QTBT/MTT structure for the luminance component and another QTBT/MTT structure for both chrominance components (or two QTBT/MTT structures for respective chrominance components).

Video encoder 22 and video decoder 30 may be configured to use quad-tree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU.

After video encoder 22 generates predictive blocks (e.g., luma, Cb, and Cr predictive blocks) for one or more PUs of a CU, video encoder 22 may generate one or more residual blocks for the CU. For instance, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. Each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, as discussed above, video encoder 22 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

In some examples, video encoder 22 skips application of the transforms to the transform block. In such examples, video encoder 22 may treat residual sample values in the same way as transform coefficients. Thus, in examples where video encoder 22 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), video encoder 22 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 22 may quantize transform coefficients of the coefficient block. After video encoder 22 quantizes a coefficient block, video encoder 22 may entropy encode syntax elements indicating the quantized transform coefficients. For example, video encoder 22 may perform Context-Adaptive Binary Arithmetic Coding (CABAC) or other entropy coding techniques on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 22. Video decoder 30 may decode the bitstream to reconstruct pictures of the video data. As part of decoding the bitstream, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

The techniques disclosed herein are built upon block-based intra prediction which is part of video standards including AVC, HEVC, and VVC. In block-based intra prediction, typically, lines of reference samples from adjacent reconstructed blocks are used for predicting samples within the current block. One or multiple lines of samples may be used for prediction. The reference samples are employed by typical intra prediction modes such as DC, planar, and angular/directional modes.

Intra prediction performs image block prediction using the block's spatially neighboring reconstructed image samples. With intra prediction, an NxM (e.g., 4x4) block is predicted by the above and left neighboring reconstructed samples (reference samples) along a selected prediction direction. As one example, the block is predicted by the above and left neighboring reconstructed samples (i.e., reference samples) along a selected prediction direction. The reference samples are external to the block being predicted. With the reference samples, a video encoder 22 constructs a prediction block having prediction samples based on the reference samples.

In general, intra prediction techniques, video encoder 22 determines a residual block indicating differences between the prediction block and the current block (e.g., residual values indicating differences between prediction samples and samples of the current block), and signals information indicative of the residual values in the residual block. Video decoder 30 similarly determines the reference samples and constructs the prediction block. Video decoder 30 determines the residual values of the residual block based on the received information and adds the residual values of the residual block to the prediction samples of the prediction block to reconstruct the current block.

As described in more detail, the example techniques described in this disclosure modify one or more (e.g., all) of the prediction samples of the prediction block. Video encoder 22 may determine the residual values based on the modified prediction samples. Video decoder 30 may add the residual values to the modified prediction samples to reconstruct the current block. As also described in more detail, the techniques are applicable for angular intra prediction modes, and the manner in which the prediction samples are modified may be based on the angular intra prediction mode used to encode or decode the current block.

There are a plurality of intra prediction modes. In some examples, the intra prediction of a luma block includes 35 modes, including the Planar mode, DC mode and 33 angular modes (e.g., diagonal intra prediction modes and angular modes adjacent to the diagonal intra prediction modes). The 35 modes of the intra prediction are indexed as shown in the table below. In other examples, more intra modes may be defined including prediction angles that may not already be represented by the 33 angular modes. In other examples, the prediction angles associated with the angular modes may be different from those used in HEVC.

TABLE 1

| Specification of intra prediction mode and associated names | |
|---|---|
| Intra prediction mode | Associated name |
| 0 | INTRA_PLANAR |
| 1 | INTRA_DC |
| 2 . . . 34 | INTRA_ANGULAR2 . . . INTRA_ANGULAR34 |

To perform Planar prediction for an NxN block, for each sample $p_{xy}$ located at (x, y), the prediction value may be calculated by applying a bilinear filter to four specific neighboring reconstructed samples, i.e., reference samples. The four reference samples include the top-right reconstructed sample TR, the bottom-left reconstructed sample BL, and the two reconstructed samples located at the same column ($r_{x,-1}$) and row ($r_{-1,y}$) of the current sample. The planar mode can be formulated as below:

$$p_{xy}=((N-x1)\cdot L+(N-y1)\cdot T+x1\cdot R+y1\cdot B)/(2*N)$$

where x1=x+1, y1=y+1, R=TR and B=BL.

For DC mode, the prediction block is filled with the average value of the neighboring reconstructed samples. Generally, both Planar and DC modes are applied for modeling smoothly varying and constant image regions.

For angular intra prediction modes in HEVC, which include 33 different prediction directions, the intra prediction process can be described as follows. For each given angular intra prediction mode, the intra prediction direction can be identified accordingly; for example, intra mode 18 corresponds to a pure horizontal prediction direction, and intra mode 26 corresponds to a pure vertical prediction direction.

Given a specific intra prediction direction, for each sample of the prediction block, its coordinate (x, y) is first projected to the row/column of neighboring reconstructed samples along the prediction direction. Suppose (x,y) is projected to the fractional position a between two neighboring reconstructed samples L and R; then the prediction value for (x, y) may be calculated using a two-tap bi-linear interpolation filter, formulated as follows:

$$p_{xy}=(1-a)\cdot L+a\cdot R.$$

For instance, coordinates (x,y) of a sample of a prediction block are projected along a specific intra prediction direction (e.g., one of the angular intra prediction modes). To avoid floating point operations, in HEVC, the above calculation is actually approximated using integer arithmetic as:

$$p_{xy}=((32-a')\cdot L+a'\cdot R+16)>>5,$$

where a' is an integer equal to 32*a.

In some examples, before intra prediciton, the neighboring reference samples are filtered using a 2-Tap bilinear or 3-Tap (1,2,1)/4 filter, as known as intra reference smoothing, or mode-dependent intra smoothing (MDIS). When doing intra prediciton, given the intra prediction mode index (predModeIntra) and block size (nTbS), it is decided whether a reference smoothing process is performed and which smoothing filter is used. The intra prediction mode index is an index indicating an intra prediction mode.

The prediction samples of a prediction block are generated using the above example techniques. After the predictions amples are generated, one or more of the prediction samples may be modified using Position Dependent Intra Prediction Combination (PDPC). Forms of PDPC are described in ITU-T SG16/Q6 Doc. COM16-C1046, "Position Dependent intra Prediction Combination (PDPC), and X. Zhao, V. Seregin, A. Said, M. Karczewicz, "EE1 related: Simplification and extension of PDPC", 8th JVET Meeting, Macau, October 2018, JVET-H0057. Disclosed in that document is the introduction of PDPC applied to planar, DC, horizontal and vertical modes without signaling as summarized in the following.

The prediction sample pred(x,y) located at (x, y) is predicted with an intra prediction mode (DC, planar, angular) and its value is modified using the PDPC expression for a single reference sample line:

$$pred(x,y)=(wL\times R-1,y+wT\times Rx,-1-wTL\times R-1,-1+(64-wL-wT+wTL)\times pred'(x,y)+32)>>6,\quad\text{(Equation 1)}$$

In equation 1, pred'(x,y) is the value of the prediction sample as determined using the above example techniques for generating prediction samples, and pred(x,y) is the modified value of pred'(x,y). In equation 1, Rx,-1, R-1,y represent the reference samples located at the top and left of current sample (x, y) and external to the current block, respectively, and R-1,-1 represents the reference sample located at the top-left corner and external of the current block. In other words, Rx,-1 represents a sample that is one row above the current block with the same x-coordinate as the x-coordinate of the prediction sample being modified, and R-1,y represents a sample that is one column left of the current block with the same y-coordinate as the y-coordinate of the prediction sample being modified.

The samples (e.g., reference samples) that are being used to modify the prediction sample are samples in the picture (e.g., luma and chroma samples), and not necessarily other prediction samples (although possible). For example, assume that a current block being intra predicted is sized N×M. For this current block, video encoder 22 and video decoder 30 may generate an N×M sized prediction block. The reference samples used to modify the prediction samples are those of the current picture (e.g., luma and/or chroma samples) that includes the current block and are external to the current block.

The coordinate system for identifying the samples external to the current block are relative to the current block. For example, the sample located at the top-left corner of the current block has a coordinate of (0, 0). Video encoder 22 may determine a residual between the prediction sample located at the top-left corner of the prediction block (e.g., having coordinate (0, 0)) and the sample in the current block having coordinate (0, 0). To reconstruct the sample located at (0, 0) in the current block, video decoder 30 may add the prediction sample located at (0, 0) in the prediction block to the residual value corresponding to the sample located at (0, 0). Accordingly, for each sample in the current block, there is a corresponding sample in the prediction block (e.g., having a same coordinate).

Accordingly, Rx,-1, means that the y-coordinate is -1, and therefore refers to a sample in the row that is above the current block. The x-coordinate may be the same as the x-coordinate of the prediction sample that is being modified. For R-1,y, the x-coordinate is -1, and therefore refers to a column that is left of the current block. The y-coordinate may be the same as the y-coordinate of the prediction sample that is being modified.

It may be possible to use a different coordinate system as well, such as a coordinate system where the (0, 0) coordinate refers to the top-left sample of the picture. The example techniques are described with respect to a coordinate system where the (0, 0) coordinate refers to the top-left sample of the block.

For the DC mode, the weights are calculated as follows for a block with dimensions width and height:

$$wT=32>>((y<<1)>>\text{shift}),wL=32>>((x<<1)>>\text{shift}),$$
$$wTL=(wL>>4)+(wT>>4),$$

In the above equation, shift=(log 2(width)+log 2(height)+2)>>2, while for planar mode wTL=0, for horizontal mode wTL=wT and for vertical mode wTL=wL. The PDPC weights can be calculated with adds and shifts only. The value of pred(x,y) can be computed in a single step using Equation 1.

Figure 2A:
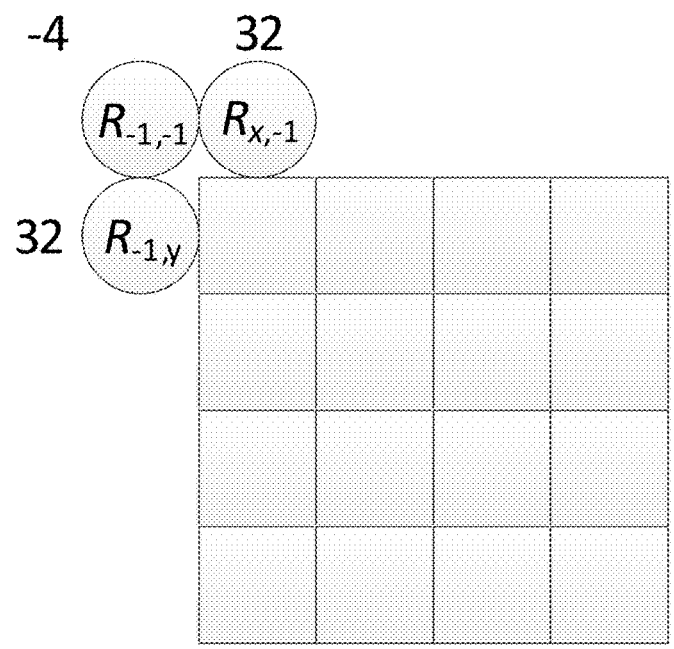
FIGS. 2A and 2B are conceptual diagrams illustrating examples of DC mode PDPC weights for sample positions inside a 4×4 block.
Figure 2B:
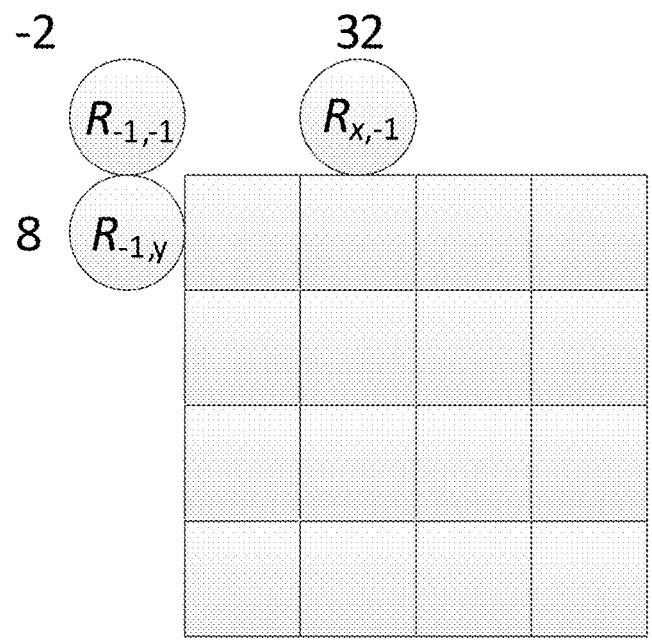

FIG. 2A illustrates DC mode PDPC weights (wL, wT, wTL) for (0, 0) position inside one 4×4 block. FIG. 2B illustrates DC mode PDPC weights (wL, wT, wTL) for (1, 0) position inside one 4×4 block. If PDPC is applied to DC, planar, horizontal, and vertical intra modes, additional boundary filters are not applied, such as the DC mode boundary filter or horizontal/vertical mode edge filters. The Equation 1 may be generalized to include additional reference sample lines (e.g., not limited to samples one row above or one row left of the current block). In this case, multiple reference samples are available in the neighborhoods of Rx,−1, R−1,y, R−1,−1 and each may have a weight assigned that can be optimized, for example, by training.

Figure 3:
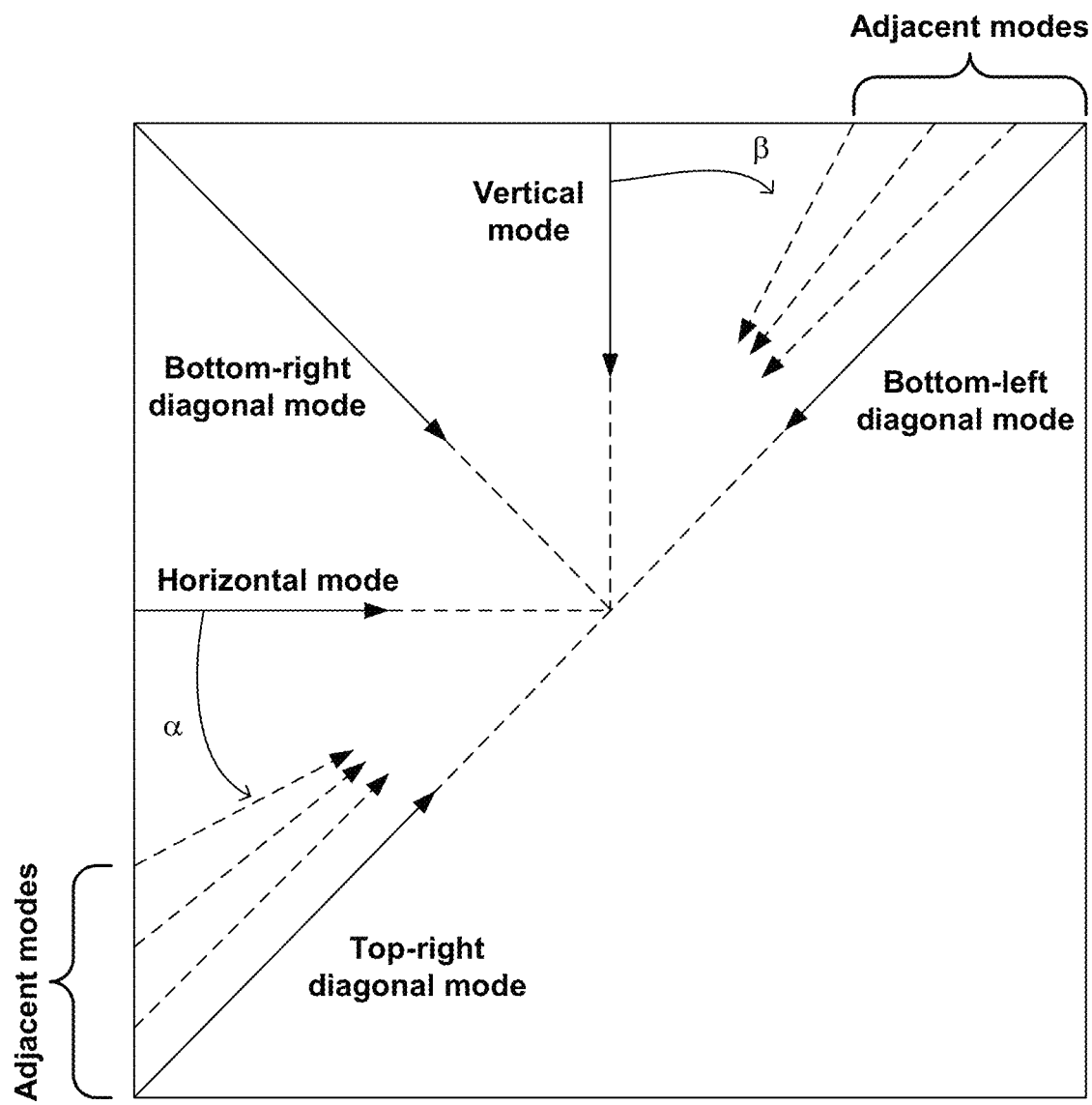
FIG. 3 is a conceptual diagram illustrating examples of intra prediction angular modes.

As disclosed herein, the PDPC can now be extended to angular modes generally (e.g., to the diagonal intra modes and to the angular modes that are adjacent to the diagonal modes). The intended diagonal intra modes are the modes that predict according to the bottom-left and top-right directions, as well as several adjacent angular modes, for example, N adjacent modes between the bottom-left diagonal mode and vertical mode, and N or M adjacent modes between the top-right diagonal mode and horizontal mode. FIG. 3 illustrates the identification of the angular modes as disclosed herein. In general, the adjacent modes may be a selected subset of available angular modes. The spacing between angular modes may, for example, be nonuniform and some angular modes may, for example, be skipped.

In the example techniques described in this disclosure, video encoder 22 and video decoder 30 may be configured to perform PDPC where the current block is intra predicted in an angular mode that excludes DC, planar, vertical, or horizontal modes. However, there may be technical complexities in extending PDPC to angular intra prediction modes. For example, the reference samples, while located external to the current block need not have the same x- and/or y-coordinates as the prediction sample being modified. Therefore, it may be uncertain which reference samples to use for modifying the prediction sample, such that video coding efficiencies are gained.

For example, if the information needed to signal the residual values is reduced, there is an increase in bandwidth efficiencies. Accordingly, the reference samples used to modify the prediction block should be such that the residual values generated from the modified prediction block require a lesser amount of information to be signaled, as compared to other techniques. However, if the determination of which reference samples to use is overly intensive, there may be latency in how long it takes video decoder 30 to reconstruct the current block.

This disclosure describes example techniques that provide a practical application to video coding techniques such as those for PDPC used with angular intra prediction modes. For instance, the example techniques provide for a technical solution for use of PDPC with angular intra prediction modes. Example ways in which video encoder 22 and video decoder 30 may perform PDPC with angular intra prediction modes is described in more detail below.

As one example, video encoder 22 may be configured to determine a prediction block, which includes a plurality of prediction samples, for a current block based on an angular intra prediction mode that is not a DC, planar, horizontal, or vertical intra prediction mode and modify a prediction sample of the prediction block to generate a modified prediction sample using Position Dependent Intra Prediction Combination (PDPC). It should be understood that although the techniques are described with respect to one prediction sample, the example techniques are not so limited. In some examples, video encoder 22 may modify the other prediction samples of the prediction block using PDPC.

To modify the prediction sample, video encoder 22 may determine one or more reference samples that are external to the current block based on the angular intra prediction mode and modify the prediction sample to generate the modified prediction sample based on the determined one or more reference samples. Video encoder 22 may determine a residual value for a residual block based on the modified prediction sample and a sample value in the current block and signal information indicative of the residual value.

As one example, video decoder 30 may be configured to determine a prediction block, which includes a plurality of prediction samples, for a current block based on an angular intra prediction mode that is not a DC, planar, horizontal, or vertical intra prediction mode and modify a prediction sample of the prediction block to generate a modified prediction sample using Position Dependent Intra Prediction Combination (PDPC). Similar to above, although the techniques are described with respect to one prediction sample, the example techniques are not so limited. In some examples, video decoder 30 may modify the other prediction samples of the prediction block using PDPC.

To modify the prediction sample, video decoder 30 may be configured to determine one or more reference samples that are external to the current block based on the angular intra prediction mode and modify the prediction sample to generate the modified prediction sample based on the determined one or more reference samples. Video decoder 30 may also be configured to reconstruct a sample of the current block based on the modified prediction sample and a residual value.

Figure 4A:
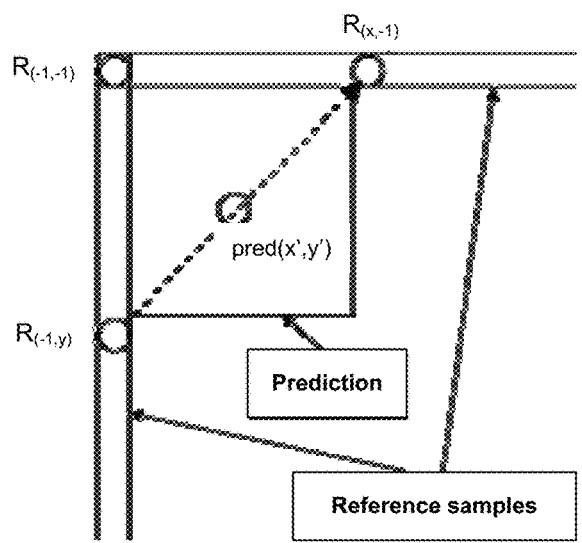
FIG. 4A is a conceptual diagram illustrating an example of a diagonal top-right mode.

FIGS. 4A-4D illustrate definition of samples used by PDPC extension to diagonal and adjacent angular intra modes. FIG. 4A illustrates the definition of reference samples Rx,−1, R−1,y and R−1,−1 for the extension of PDPC to the top-right diagonal mode. The prediction sample pred(x', y') is located at (x', y') within the prediction block. The coordinate x of the reference sample Rx,−1 is given by: x=x'+y'+1 and the coordinate y of the reference sample R−1,y is similarly given by: y=x'+y'+1. The PDPC weights for the top-right diagonal mode are, for example: wT=16>>((y'<<1)>>shift), wL=16>>((x'<<1)>>shift), wTL=0.

Figure 4B:
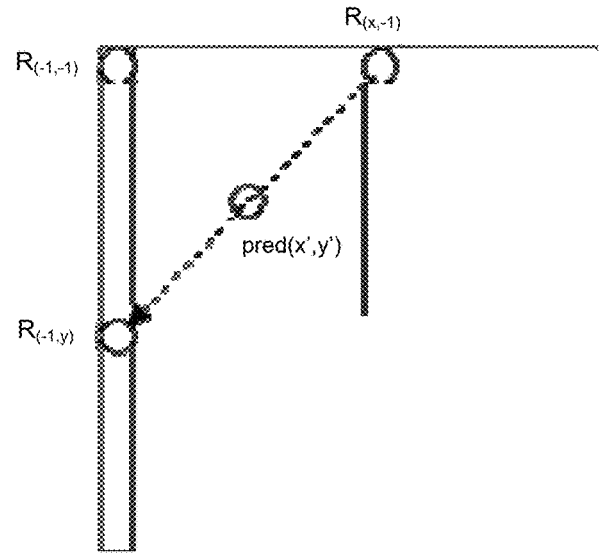
FIG. 4B is a conceptual diagram illustrating an example of a diagonal bottom-left mode.

Similarly, FIG. 4B illustrates the definition of reference samples Rx,−1, R−1,y and R−1,−1 for the extension of PDPC to the bottom-left diagonal mode. The coordinate x of the reference sample Rx,−1 is given by: x=x'+y'+1, and the coordinate y of the reference sample R−1,y is: y=x'+y'+1. The PDPC weights for the top-right diagonal mode are, for example: wT=16>>((y'<<1)>>shift), wL=16>>((x'<<1)>>shift), wTL=0.

In FIGS. 4A and 4B, video encoder 22 and video decoder 30 may each determine a row that is above the current block (e.g., immediately above but the techniques are not so limited) and determine an x-coordinate in the determined row. The x-coordinate in the determined row is equal to an x-coordinate of the prediction sample plus a y-coordinate of the prediction sample plus 1. Video encoder 22 and video decoder 30 may determine a reference sample of the one or more reference samples based on the determined row and the determined x-coordinate.

Similarly, in FIGS. 4A and 4B, video encoder 22 and video decoder 30 may determine a column that is left of the current block (e.g., immediately left but the techniques are not so limited) and determine a y-coordinate in the determined column. The y-coordinate in the determined column is equal to an x-coordinate of the prediction sample plus a y-coordinate of the prediction sample plus 1. Video encoder 22 and video decoder 30 may determine a reference sample of the one or more reference samples based on the determined column and the determined y-coordinate.

Based on the determined x and y-coordinates, video encoder 22 and video decoder 30 may determine the reference samples (e.g., a first reference sample based on the determined row and determined x-coordinate and a second reference sample based on the determined column and determined y-coordinate). Also, video encoder 22 and video decoder 30 may determine the weights according to the above example techniques for the diagonal modes (e.g., top-right diagonal mode and bottom-left diagonal mode, as two examples). Then, based on Equation 1 (as one non-limiting example), video encoder 22 and video decoder 30 may determine the modified prediction sample (e.g., pred(x,y)).

Figure 4C:
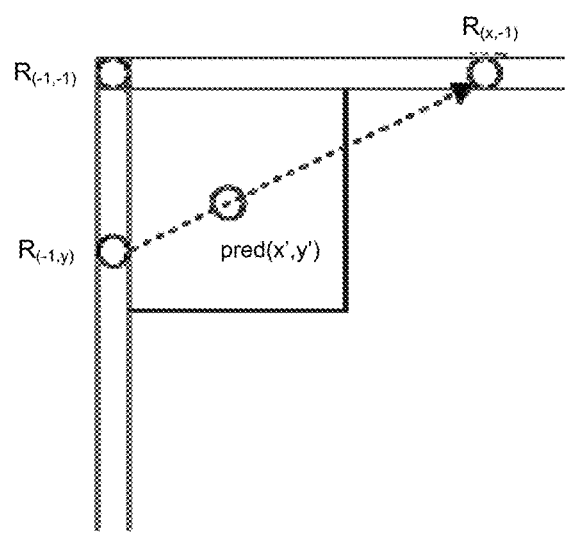
FIG. 4C is a conceptual diagram illustrating an example of an adjacent diagonal top-right mode.

The case of an adjacent top-right diagonal mode is illustrated in FIG. 4C. In general, for the angle α defined in FIG. 3, the y coordinate of the reference sample R−1,y is determined as follows: $y=y'+\tan(\alpha)\times(x'+1)$ and the x coordinate of Rx,−1 is given by: $x=x'+\cotan(\alpha)\times(y'+1)$, with $\tan(\alpha)$ and $\cotan(\alpha)$ the tangent and cotangent of the angle α. The PDPC weights for an adjacent top-right diagonal mode are, for example: $wT=32>>((y'<<1)>>shift)$, $wL=32>>((x'<<1)>>shift)$, $wTL=0$ or $wT=32>>((y'<<1)>>shift)$, $wL=0$, $wTL=0$.

Figure 4D:
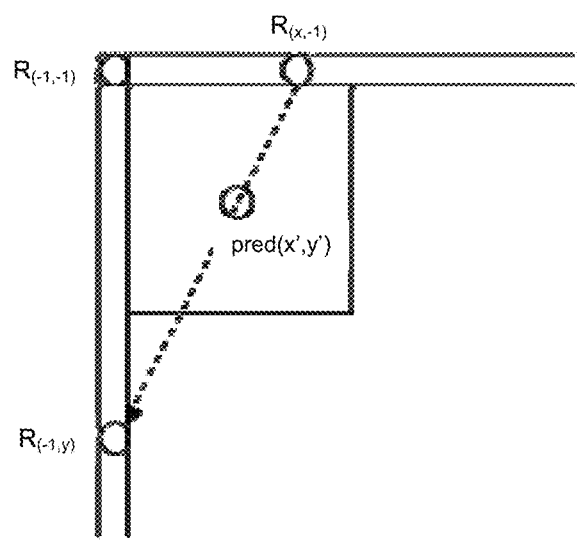
FIG. 4D is a conceptual diagram illustrating an example of an adjacent diagonal bottom-left mode.

Similarly, the case of an adjacent bottom-left diagonal mode is illustrated in FIG. 4D. In general, for the angle β defined in FIG. 3, the x coordinate of the reference sample Rx,−1 is determined as follows $x=x'+\tan(\beta)\times(y'+1)$ and the y coordinate of R−1,y is given by $y=y'+\cotan(\beta)\times(x'+1)$, with $\tan(\beta)$ and $\cotan(\beta)$ the tangent and cotangent of the angle β. The PDPC weights for an adjacent bottom-left diagonal mode are, for example: $wL=32>>((x'<<1)>>shift)$, $wT=32>>((y'<<1)>>shift)$, $wTL=0$ or $wL=32>>((x'<<1)>>shift)$, $wT=0$, $wTL=0$.

In FIGS. 4C and 4D, video encoder 22 and video decoder 30 may each determine a row that is above the current block (e.g., immediately above but the techniques are not so limited) and determine an x-coordinate in the determined row. The x-coordinate in the determined row is based on an angle of the angular intra prediction mode. Video encoder 22 and video decoder 30 may determine a reference sample of the one or more reference samples based on the determined row and the determined x-coordinate.

To determine the x-coordinate in the determined row, video encoder 22 and video decoder 30 may determine one of a cotangent (e.g., for adjacent top-right diagonal mode) or tangent (e.g., for adjacent bottom-left diagonal mode) of the angle of the angular intra prediction mode. Video encoder 22 and video decoder 30 may determine the x-coordinate in the determined row based on one of the cotangent or tangent of the angle of the angular intra prediction mode, an x-coordinate of the prediction sample, and a y-coordinate of the prediction sample. For instance, for adjacent top-right diagonal angular intra prediction mode, the x-coordinate in the determined row is equal to $x'+\cotan(\alpha)\times(y'+1)$ and for adjacent bottom-left diagonal mode, the x-coordinate in the determined row is equal to $x'+\tan(\beta)\times(y'+1)$, where x' and y' are the x and y-coordinates of the prediction sample being modified.

Similarly, in FIGS. 4C and 4D, video encoder 22 and video decoder 30 may each determine a column that is left of the current block (e.g., immediately left but the techniques are not so limited) and determine a y-coordinate in the determined column. The y-coordinate in the determined column is based on an angle of the angular intra prediction mode. Video encoder 22 and video decoder 30 may determine a reference sample of the one or more reference samples based on the determined column and the determined y-coordinate.

To determine the y-coordinate in the determined column, video encoder 22 and video decoder 30 may determine one of a cotangent (e.g., for adjacent bottom-left diagonal mode) or tangent (e.g., for adjacent top-right diagonal mode) of the angle of the angular intra prediction mode. Video encoder 22 and video decoder 30 may determine the y-coordinate in the determined column based on one of the cotangent or tangent of the angle of the angular intra prediction mode, an x-coordinate of the prediction sample, and a y-coordinate of the prediction sample. For instance, for adjacent top-right diagonal angular intra prediction mode, the y-coordinate in the determined column is equal to $y'+\tan(\alpha)\times(x'+1)$ and for adjacent bottom-left diagonal mode, the y-coordinate in the determined column is equal to $y'+\cotan(\beta)\times(x'+1)$, where x' and y' are the x and y-coordinates of the prediction sample being modified.

Based on the determined x and y-coordinates, video encoder 22 and video decoder 30 may determine the reference samples (e.g., a first reference sample based on the determined row and determined x-coordinate and a second reference sample based on the determined column and determined y-coordinate). Also, video encoder 22 and video decoder 30 may determine the weights according to the above example techniques for the adjacent diagonal modes (e.g., adjacent top-right diagonal mode and adjacent bottom-left diagonal mode, as two examples). Then, based on Equation 1 (as one non-limiting example), video encoder 22 and video decoder 30 may determine the modified prediction sample (e.g., pred(x,y)).

The above describes example techniques for the top-right and bottom-left diagonal modes and the adjacent top-right and adjacent bottom-left diagonal modes as example angular modes for which PDPC can be applied. The example techniques may be extended to other angular modes as well. Also, in some examples, the one or more reference samples have both an x- and y-coordinate that is different than both an x- and y-coordinate of the prediction sample in the prediction block. For instance, in the above example equations to determine the x and y coordinates in respective rows and columns to determine the reference samples, the x coordinate is different than the x coordinate of the prediction sample being modified and the y coordinate is different than the y coordinate of the prediction sample being modified. That is, the reference samples may not be in the same row or same column as the prediction sample being modified.

As is the case for DC, planar, horizontal and vertical mode PDPC, there is no additional boundary filtering, for example as specified in 'J. Chen, E. Alshina, G. J. Sullivan, J.-R. Ohm, J. Boyce, "Algorithm description of Joint Exploration Test Model 7," 7th JVET Meeting, Torino, Italy, July 2017, JVET-G1001, for diagonal and adjacent diagonal modes when PDPC is extended to these angular modes.

As described above, the example techniques described in this disclosure may allow for PDPC to be applied to angular intra prediction modes with minimal impact to complexity. In a practical implementation, the values of the tangents and cotangents of angles can be stored in tables so that they are not computed on the fly (e.g., at run-time). The following are example tables for 129 angular modes in total:

TanAngTable[33]={0, 1, 2, 3, 4, 5, 6, 8, 10, 12, 14, 16, 18, 20, 22, 24, 26, 28, 30, 32, 34, 36, 38, 40, 42, 44, 46, 49, 52, 55, 58, 61, 64}.

CotanAngTable[33]={0, 65536, 32768, 21845, 16384, 13107, 10923, 8192, 6554, 5461, 4681, 4096, 3641, 3277, 2979, 2731, 2521, 2341, 2185, 2048, 1928, 1820, 1725, 1638, 1560, 1489, 1425, 1337, 1260, 1192, 1130, 1074, 1024}.

Moreover, the tables may already be employed by the angular intra prediction of blocks and can be reused for the PDPC extension to diagonal and adjacent modes (e.g., the angular intra prediction modes). Therefore, no additional tables may be required in the implementation of PDPC. In some examples, custom tables can be produced, for example by training, to further optimize PDPC.

In some cases, all horizontal angular modes are mapped to vertical modes by flipping the block around the bottom-right diagonal. The symmetry around the vertical mode allows the number of angles to be further reduced to 33 with stored tangent and cotangent values in the TanAngTable and CotanAngTable, respectively. Due to required integer precision, the values in both tables are scaled by factor 64 in case of TanAngTable and value 1024 in case of CotanAngTable. The multiplications in the formulas above for computing coordinates x and y are avoided by accumulating the table values corresponding with the angular mode with increasing x' and y' while traversing the prediction block.

Interpolation of the reference samples, for example, by linear or cubic interpolation, or nearest neighbor rounding may be used if fractional values are calculated. For example, to determine one or more reference samples that are external to the current block based on the angular intra prediction mode, video encoder 22 and video decoder 30 may be configured to determine a set of one or more samples based on the angular intra prediction mode and interpolate the set of one or more samples to generate the one or more reference samples. Interpolation is one example. In some examples, video encoder 22 or video decoder 30 may perform at least one of interpolation, rounding with offset, or rounding without offset. Video encoder 22 or video decoder 30 may perform such rounding with or without offset based on neighboring samples in the set of one or more samples to generate the one or more reference samples.

Clipping may be required to prevent the access of reference samples outside the reference line buffer boundaries in case large coordinate values are computed. If clipping is performed, the last available reference sample may be used or PDPC may fall back to angular intra prediction only, which is equivalent to applying zero weights for wL, wT, wTL in Eq. 1, for example. For instance, to determine one or more reference samples that are external to the current block based on the angular intra prediction mode, video encoder 22 and video decoder 30 may be configured to determine that one or more samples external to the current block identified based on the angular intra prediction mode are not stored in a reference line buffer and determine the one or more reference samples based on a last reference sample stored in the reference line buffer.

In some examples, rather than using the last sample in the reference line buffer, PDPC may be disabled for the current block or PDPC may be disabled for certain predicted samples such that normal intra prediction (e.g., without modified prediction samples) is used. As one example, for a prediction sample in the prediction block, video encoder 22 or video decoder 30 may determine that a first reference sample is available in the reference buffer but that a second reference sample is not available in the reference buffer. In this example, video encoder 22 or video decoder 30 may determine that PDPC is disabled for the prediction sample. However, in some examples, video encoder 22 or video decoder 30 may utilize the first reference sample for PDPC and not utilize the second reference sample (e.g., by setting a weight for the second reference sample equal to zero).

As described above, in some examples, video encoder 22 and video decoder 30 may perform the example PDPC techniques on a plurality of prediction samples in a prediction block. However, there may be instances where PDPC technique are used on some of the prediction samples but not other prediction samples in the same prediction block. For example, assume that for a first prediction sample in a prediction block, video encoder 22 or video decoder 30 perform the PDPC techniques described in this disclosure. However, for a second prediction sample in the same prediction block, assume that the reference samples needed to perform PDPC techniques on the second prediction sample are not stored in the reference line buffer. In this example, for the second prediction sample, video encoder 22 or video decoder 30 may not perform PDPC techniques and normal intra-prediction techniques may be utilized. In some cases, for the second prediction sample, it may be possible that one of the reference samples is available in the reference line buffer but the other one is not. In some examples, video encoder 22 or video decoder 30 may not perform PDPC techniques on the second prediction sample or may utilize only the reference sample that is available and assign a zero weight to the weights applied to the reference sample that is not available.

The compression efficiency of the PDPC extension to diagonal and adjacent angular modes is illustrated in the following tables. In total there are 16 modes adjacent to the top-right diagonal mode and 16 modes adjacent to the bottom-left diagonal mode in this example test. The example test condition is All-Intra and utilized QP values are {22, 27, 32, 37}. Table 1 (FIG. 5A) represents All-intra test condition BD-rates for PDPC extension (diagonal and adjacent) excluding diagonal and adjacent mode boundary filtering. Table 1 of FIG. 5A enumerates BD-rates when the test is with boundary filtering for diagonal and adjacent modes disabled. Further, Table 2 (FIG. 5B) represents All-intra test condition BD-rates for PDPC extension (diagonal and adjacent) including diagonal and adjacent mode boundary filtering. Further, Table 2 of FIG. 5B enumerates BD-rates when the test is with boundary filtering for diagonal and adjacent modes enabled.

Like the PDPC extension for diagonal and adjacent angular modes, PDPC can be extended to the angular modes that are adjacent to the horizontal and vertical modes. Adjacent angular modes in this case may refer to angular modes on both sides of horizontal and vertical modes. In case of adjacent horizontal angular modes, the x coordinate of $R_{x,-1}$ is equal to the x coordinate of pred(x,y). Example PDPC weights are: wT=16>>((y<<1)>>shift), wL=0, wTL=wT. In case of adjacent vertical angular modes, the y coordinate of $R_{-1,y}$ is equal to the y coordinate of pred(x,y). Example PDPC weights are: wL=16>>((x<<1)>>shift), wT=0, wTL=wL.

Figure 6:
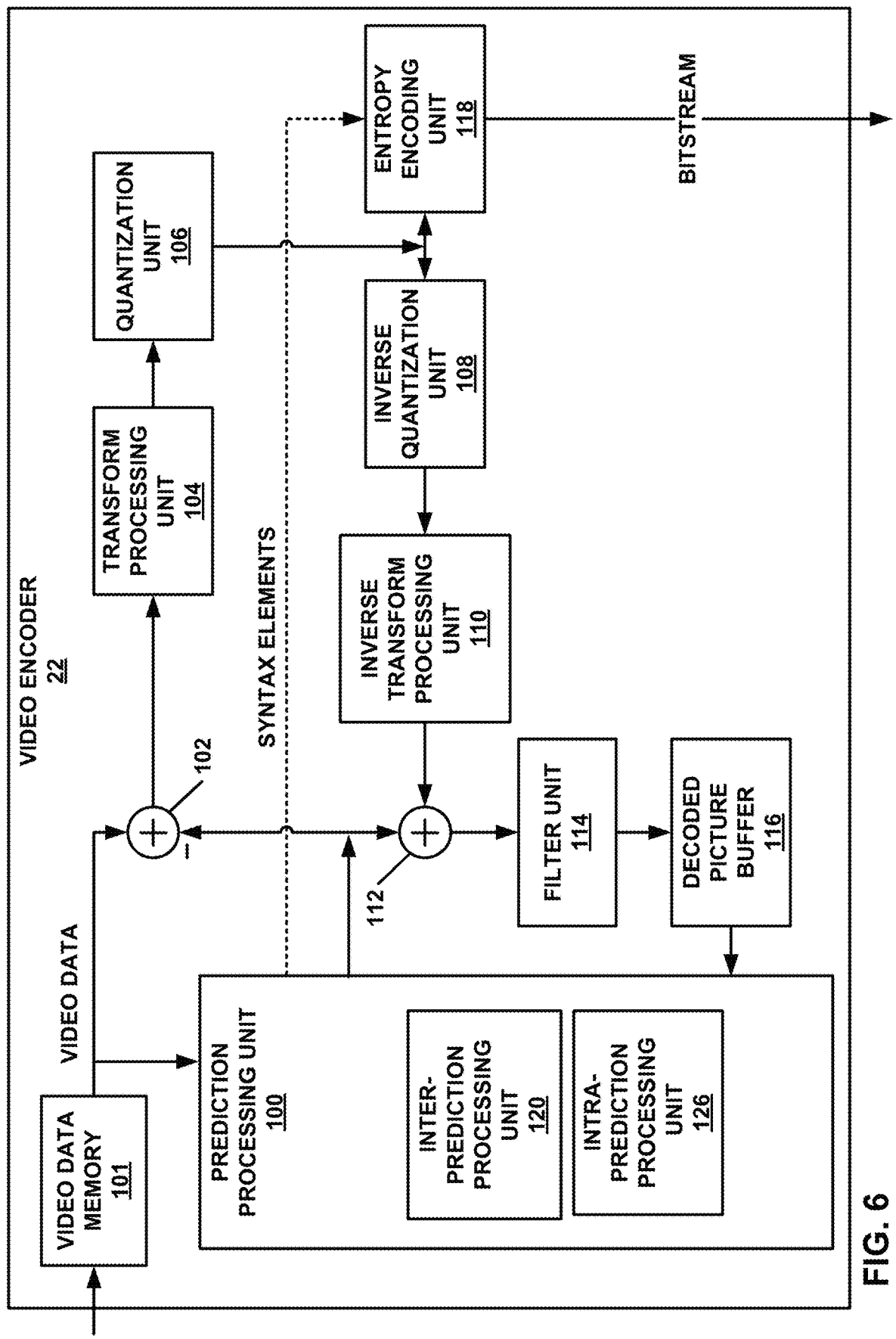
FIG. 6 is a block diagram illustrating an example of a video encoder.

FIG. 6 is a block diagram illustrating an example video encoder 22 that may implement the techniques of this disclosure. FIG. 6 is provided for purposes of explanation and should not be considered limiting of the techniques as broadly exemplified and described in this disclosure. The techniques of this disclosure may be applicable to various coding standards (e.g., HEVC or VVC) or methods.

The various units of FIG. 6 are illustrated to assist with understanding the operations performed by video encoder 22. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

In the example of FIG. 6, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma CTBs and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns. In one example, prediction processing unit 100 or another processing unit of video encoder 22 may be configured to perform any combination of the techniques described herein.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. In accordance with techniques of this disclosure, a CU may only include a single PU. That is, in some examples of this disclosure, a CU is not divided into separate prediction blocks, but rather, a prediction process is performed on the entire CU. Thus, each CU may be associated with a luma prediction block and corresponding chroma prediction blocks. Video encoder 22 and video decoder 30 may support CUs having various sizes. As indicated above, the size of a CU may refer to the size of the luma coding block of the CU also the size of a luma prediction block. As discussed above, video encoder 22 and video decoder 30 may support CU sizes defined by any combination of the example partitioning techniques described herein.

Inter-prediction processing unit 120 may generate predictive data for a PU by performing inter prediction on each PU of a CU. As explained herein, in some examples of this disclosure, a CU may contain only a single PU, that is, the CU and PU may be synonymous. The predictive data for the PU may include predictive blocks of the PU and motion information for the PU. Inter-prediction processing unit 120 may perform different operations for a PU or a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 35 directional intra prediction modes. In some examples, the number of intra prediction modes may depend on the size of the region associated with the PU.

In one example, Intra-prediction processing unit 126 may be configured to implement techniques of the disclosure. In other examples, other units or modules may be configured to implement all or some of the techniques of the disclosure.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning or quad-tree-binary-tree (QTBT) partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT. Video encoder 22 may not further divide CUs into TUs using an RQT structure. As such, in one example, a CU includes a single TU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking filtering and/or other filtering operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents the partition structure for a CU according to the techniques of this disclosure.

Figure 7:
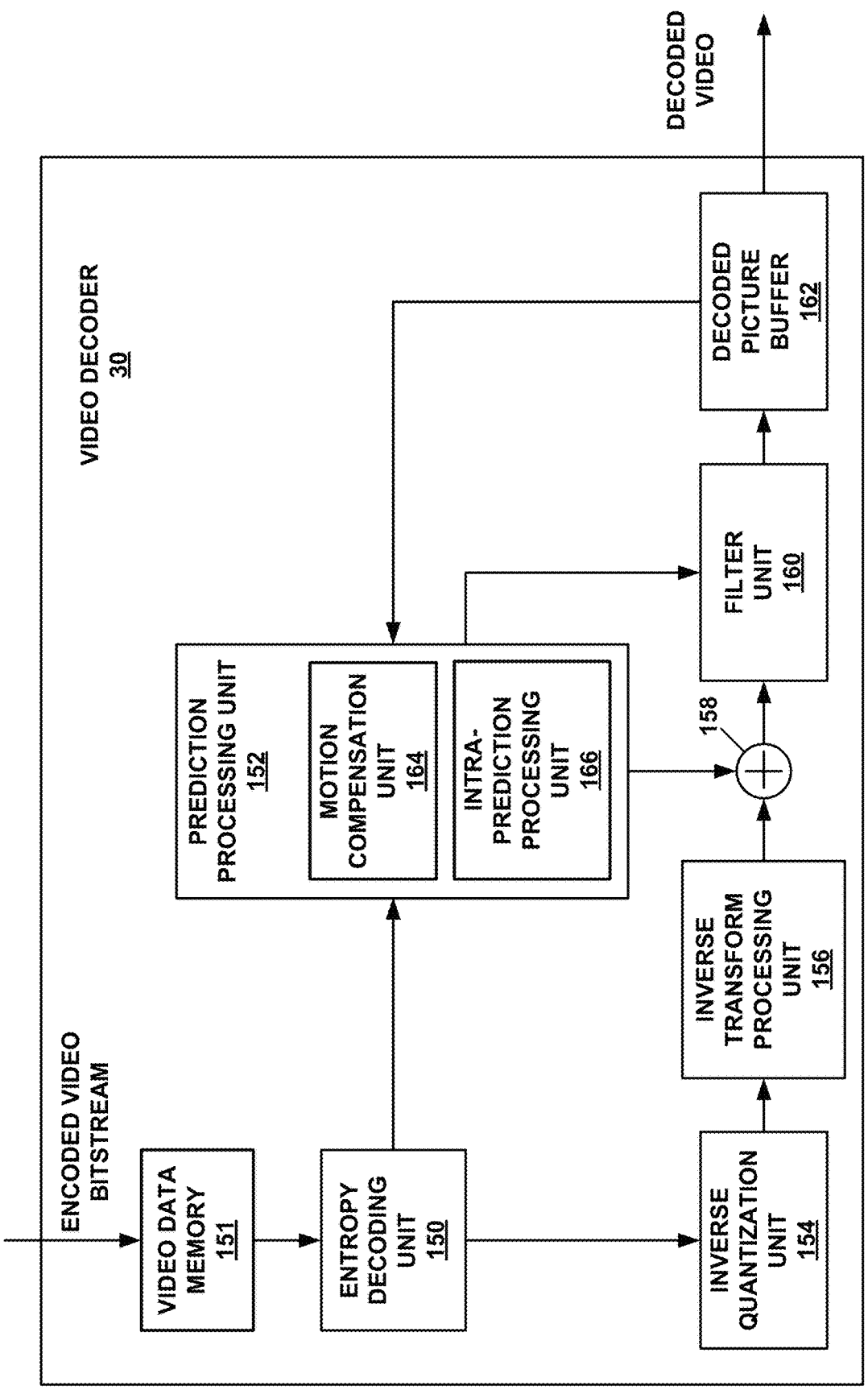
FIG. 7 is a block diagram illustrating an example of a video decoder.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC or VVC coding. However, the techniques of this disclosure may be applicable to other coding standards or methods.

The various units shown in FIG. 7 are illustrated to assist with understanding the operations performed by video decoder 30. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

In the example of FIG. 7, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In accordance with some examples of this disclosure, entropy decoding unit 150, or another processing unit of video decoder 30, may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed partition types for the respective non-leaf node and the video block corresponding to the respective non-leaf node is partitioned into video blocks corresponding to the child nodes of the respective non-leaf node according to one of the plurality of allowable splitting patterns.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU. As discussed above, in one example of the disclosure, a CU includes a single TU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a CU or PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

In one example, Intra-prediction processing unit 166 may be configured to implement techniques of the disclosure. In other examples, other units or modules may be configured to implement all or some of the techniques of the disclosure.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU. As discussed above, a CU may include only a single PU. That is, a CU may not be divided into multiple PUs.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

The video decoder outputs a decoded version of the current picture that includes a decoded version of the current block. When the video decoder is a video decoder configured to output displayable decoded video, then the video decoder may, for example, output the decoded version of the current picture to a display device. When the decoding is performed as part of a decoding loop of a video encoding process, then the video decoder may store the decoded version of the current picture as a reference picture for use in encoding another picture of the video data.

Figure 8:
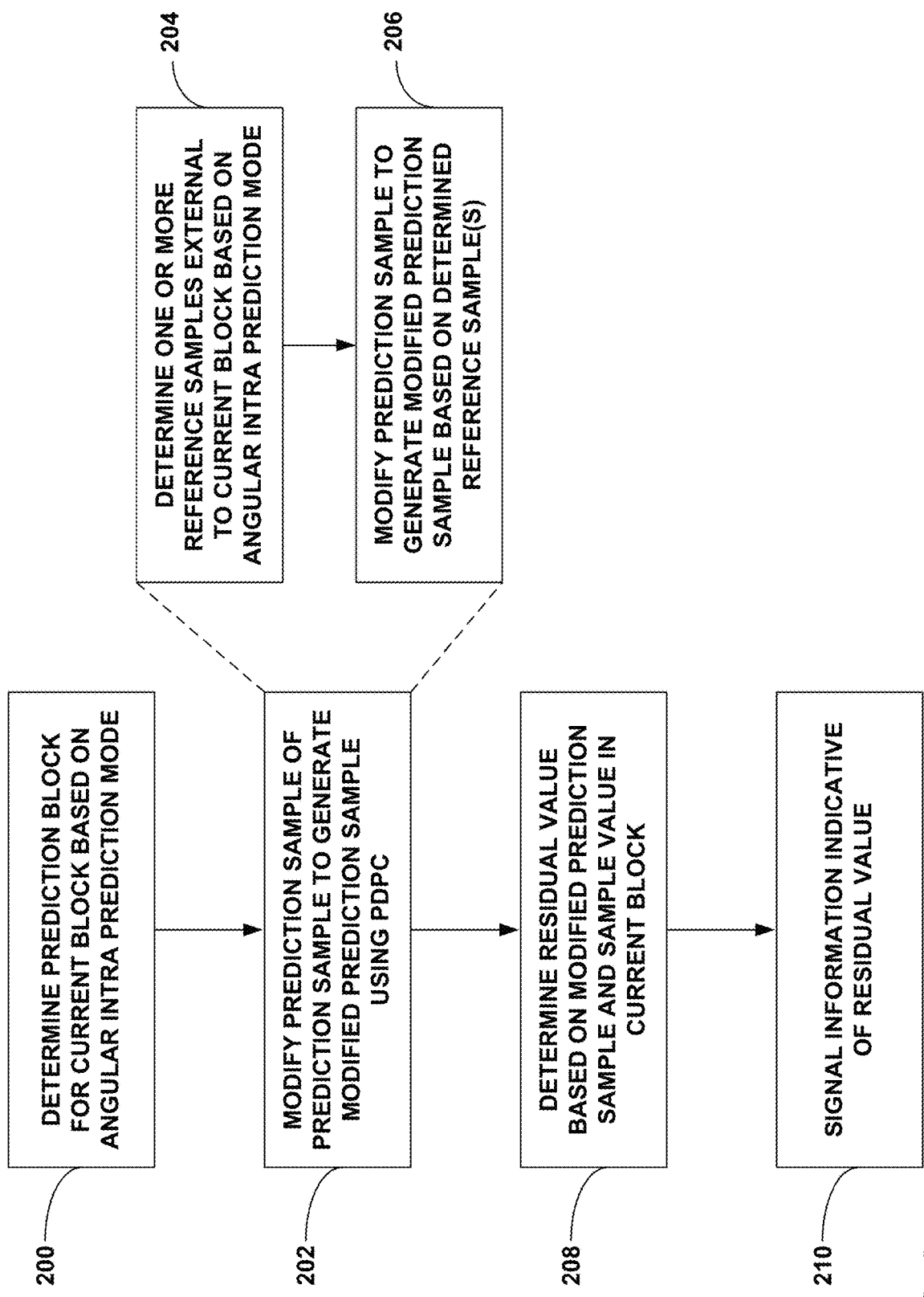
FIG. 8 is a flowchart illustrating an example method of encoding video data.

FIG. 8 is a flowchart illustrating an example method of encoding video data. Video encoder 22 (e.g., with intra prediction processing unit 126) may be configured to determine a prediction block, which includes a plurality of prediction samples, for a current block based on an angular intra prediction mode that is not DC, planar, horizontal, or vertical intra prediction mode (200). Video data memory 101 or DPB 16 may store the prediction block.

Video encoder 22 (e.g., with intra prediction processing unit 126) may be configured to modify a prediction sample of the prediction block to generate a modified prediction sample using Position Dependent Intra Prediction Combination (PDPC) (202). For example, to modify the prediction sample, video encoder 22 may be configured to determine one or more reference samples that are external to the current block based on the angular intra prediction mode (204) and modify the prediction sample to generate the modified prediction sample based on the determined one or more reference samples (206). In one example, to determine one or more reference samples that are external to the current block, video encoder 22 may be configured to determine the one or more reference samples having both an x- and y-coordinate that is different than both an x- and y-coordinate of the prediction sample in the prediction block.

As one example, to determine one or more reference samples that are external to the current block, video encoder 22 may be configured to determine a row that is above the current block and determine an x-coordinate in the determined row. The x-coordinate in the determined row is equal to an x-coordinate of the prediction sample plus a y-coordinate of the prediction sample plus 1. Video encoder 22 may determine a reference sample of the one or more reference samples based on the determined row and the determined x-coordinate. As another example, to determine one or more reference samples that are external to the current block, video encoder 22 may be configured to determine a column that is left of the current block and determine a y-coordinate in the determined column. The y-coordinate in the determined column is equal to an x-coordinate of the prediction sample plus a y-coordinate of the prediction sample plus 1. Video encoder 22 may be configured to determine a reference sample of the one or more reference samples based on the determined column and the determined y-coordinate.

As one example, to determine one or more reference samples that are external to the current block, video encoder 22 may be configured to determine a row that is above the current block and determine an x-coordinate in the determined row. The x-coordinate in the determined row is based on an angle of the angular intra prediction mode. Video encoder 22 may be configured to determine a reference sample of the one or more reference samples based on the determined row and the determined x-coordinate. To determine the x-coordinate in the determined row, video encoder 22 may be configured to determine one of a cotangent or tangent of the angle of the angular intra prediction mode and determine the x-coordinate in the determined row based on one of the cotangent or tangent of the angle of the angular intra prediction mode, an x-coordinate of the prediction sample, and a y-coordinate of the prediction sample.

As another example, to determine one or more reference samples that are external to the current block, video encoder 22 may be configured to determine a column that is left of the current block and determine a y-coordinate in the determined column. The y-coordinate in the determined column is based on an angle of the angular intra prediction mode. Video encoder 22 may be configured to determine a reference sample of the one or more reference samples based on the determined column and the determined y-coordinate. To determine the y-coordinate in the determined column, video encoder 22 may be configured to determine one of a cotangent or tangent of the angle of the angular intra prediction mode and determine the y-coordinate in the determined column based on one of the cotangent or tangent of the angle of the angular intra prediction mode, an x-coordinate of the prediction sample, and a y-coordinate of the prediction sample.

As one example, to determine one or more reference samples that are external to the current block based on the angular intra prediction mode, video encoder 22 may be configured to determine a set of one or more samples based on the angular intra prediction mode and interpolate the set of one or more samples to generate the one or more reference samples. In some examples, video encoder 22 may be configured to at least one of interpolate, round with offset, or round without offset the set of one or more samples to generate the one or more reference samples.

As one example, to determine one or more reference samples that are external to the current block based on the angular intra prediction mode, video encoder 22 may be configured to determine that one or more samples external to the current block identified based on the angular intra prediction mode are not stored in a reference line buffer and determine the one or more reference samples based on a last reference sample stored in the reference line buffer. In some example, modifying the prediction sample of the prediction block may include modifying a first prediction sample of the prediction block, and the one or more reference samples may be a first set of one or more reference samples. Video encoder 22 may be configured to determine, for a second prediction sample of the same prediction block, that at least one reference sample of a second set of one or more reference samples for the second prediction sample is not stored in a reference line buffer and perform one of the following steps: (a) not apply PDPC to the second prediction sample or (b) apply PDPC using only reference samples available in the reference line buffer (e.g., by applying zero weight to the reference sample that is not available).

In accordance with one or more examples, video encoder 22 may be configured to determine a plurality of weights based on x- and y-coordinates of the prediction sample. To modify the prediction sample, video encoder 22 may be configured to modify the prediction sample to generate the modified prediction sample based on the determined one or more reference samples, the determined weights, and the prediction sample.

Video encoder 22 may be configured to determine a residual value for a residual block based on the modified prediction sample and a sample value in the current block (208). Video encoder 22 may be configured to signal information indicative of the residual value (210).

Figure 9:
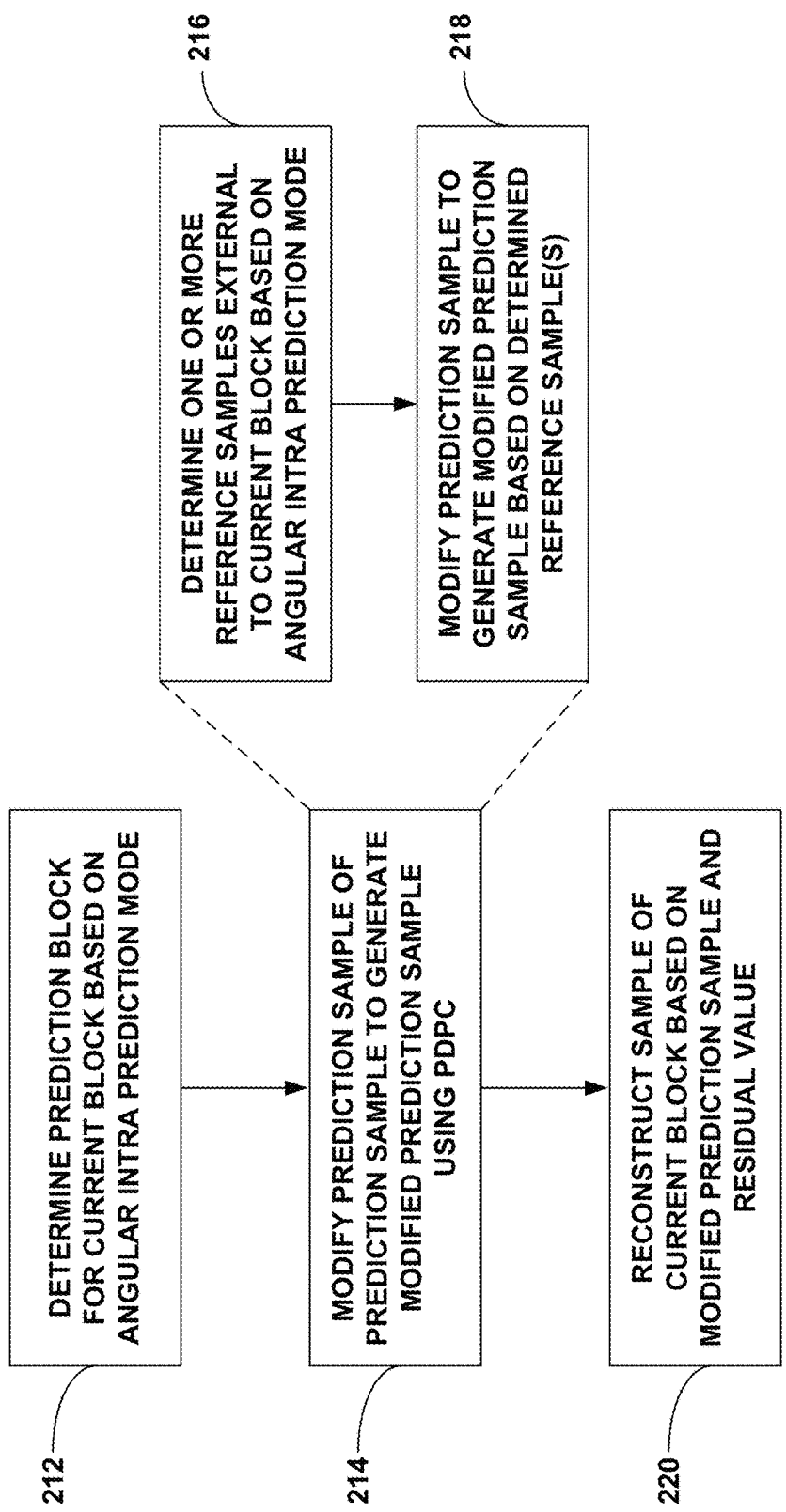
FIG. 9 is a flowchart illustrating an example method of decoding video data.

FIG. 9 is a flowchart illustrating an example method of decoding video data. Video decoder 30 (e.g., with intra prediction processing unit 166) may be configured to determine a prediction block, which includes a plurality of prediction samples, for a current block based on an angular intra prediction mode that is not DC, planar, horizontal, or vertical intra prediction mode (212). Video data memory 151 or DPB 162 may store the prediction block.

Video decoder 30 (e.g., with intra prediction processing unit 166) may be configured to modify a prediction sample of the prediction block to generate a modified prediction sample using Position Dependent Intra Prediction Combination (PDPC) (214). For example, to modify the prediction sample, video decoder 30 may be configured to determine one or more reference samples that are external to the current block based on the angular intra prediction mode (216) and modify the prediction sample to generate the modified prediction sample based on the determined one or more reference samples (218). In one example, to determine one or more reference samples that are external to the current block, video decoder 30 may be configured to determine the one or more reference samples having both an x- and y-coordinate that is different than both an x- and y-coordinate of the prediction sample in the prediction block.

As one example, to determine one or more reference samples that are external to the current block, video decoder 30 may be configured to determine a row that is above the current block and determine an x-coordinate in the determined row. The x-coordinate in the determined row is equal to an x-coordinate of the prediction sample plus a y-coordinate of the prediction sample plus 1. Video decoder 30 may determine a reference sample of the one or more reference samples based on the determined row and the determined x-coordinate. As another example, to determine one or more reference samples that are external to the current block, video decoder 30 may be configured to determine a column that is left of the current block and determine a y-coordinate in the determined column. The y-coordinate in the determined column is equal to an x-coordinate of the prediction sample plus a y-coordinate of the prediction sample plus 1. Video decoder 30 may be configured to determine a reference sample of the one or more reference samples based on the determined column and the determined y-coordinate.

As one example, to determine one or more reference samples that are external to the current block, video decoder 30 may be configured to determine a row that is above the current block and determine an x-coordinate in the determined row. The x-coordinate in the determined row is based on an angle of the angular intra prediction mode. Video decoder 30 may be configured to determine a reference sample of the one or more reference samples based on the determined row and the determined x-coordinate. To determine the x-coordinate in the determined row, video decoder 30 may be configured to determine one of a cotangent or tangent of the angle of the angular intra prediction mode and determine the x-coordinate in the determined row based on one of the cotangent or tangent of the angle of the angular intra prediction mode, an x-coordinate of the prediction sample, and a y-coordinate of the prediction sample.

As another example, to determine one or more reference samples that are external to the current block, video decoder 30 may be configured to determine a column that is left of the current block and determine a y-coordinate in the determined column. The y-coordinate in the determined column is based on an angle of the angular intra prediction mode. Video decoder 30 may be configured to determine a reference sample of the one or more reference samples based on the determined column and the determined y-coordinate. To determine the y-coordinate in the determined column, video decoder 30 may be configured to determine one of a cotangent or tangent of the angle of the angular intra prediction mode and determine the y-coordinate in the determined column based on one of the cotangent or tangent of the angle of the angular intra prediction mode, an x-coordinate of the prediction sample, and a y-coordinate of the prediction sample.

As one example, to determine one or more reference samples that are external to the current block based on the angular intra prediction mode, video decoder 30 may be configured to determine a set of one or more samples based on the angular intra prediction mode and interpolate the set of one or more samples to generate the one or more reference samples. In some examples, video decoder 30 may be configured to at least one of interpolate, round with offset, or round without offset the set of one or more samples to generate the one or more reference samples.

As one example, to determine one or more reference samples that are external to the current block based on the angular intra prediction mode, video decoder 30 may be configured to determine that one or more samples external to the current block identified based on the angular intra prediction mode are not stored in a reference line buffer and determine the one or more reference samples based on a last reference sample stored in the reference line buffer. In some example, modifying the prediction sample of the prediction block may include modifying a first prediction sample of the prediction block, and the one or more reference samples may be a first set of one or more reference samples. Video decoder 30 may be configured to determine, for a second prediction sample of the same prediction block, that at least one reference sample of a second set of one or more reference samples for the second prediction sample is not stored in a reference line buffer and perform one of the following steps: (a) not apply PDPC to the second prediction sample or (b) apply PDPC using only reference samples available in reference line buffer (e.g., by applying zero weight to the reference sample that is not available).

In accordance with one or more examples, video decoder 30 may be configured to determine a plurality of weights based on x- and y-coordinates of the prediction sample. To modify the prediction sample, video decoder 30 may be configured to modify the prediction sample to generate the modified prediction sample based on the determined one or more reference samples, the determined weights, and the prediction sample.

Video decoder 30 may be configured to reconstruct a sample of the current block based on the modified prediction sample and a residual value (220). For example, video decoder 30 may receive information for the residual value. Video decoder 30 may add the residual value to the modified prediction sample to reconstruct the sample in the current block.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a prediction block, which includes a plurality of prediction samples, for a current block based on an angular intra prediction mode that is not a DC, planar, horizontal, or vertical intra prediction mode;
   modifying a prediction sample of the plurality of prediction samples of the prediction block to generate a modified prediction sample using Position Dependent Intra Prediction Combination (PDPC), wherein modifying the prediction sample comprises:
      determining one or more reference samples that are external to the current block based on an angle of the angular intra prediction mode; and
      modifying the prediction sample to generate the modified prediction sample based on the determined one or more reference samples; and
   reconstructing a sample of the current block based on the modified prediction sample and a residual value,
   wherein determining one or more reference samples that are external to the current block comprises:
      determining, as part of using PDPC, a row that is above the current block;
      determining, as part of using PDPC, an x-coordinate in the determined row,
   wherein the x-coordinate in the determined row is based on the angle of the angular intra prediction mode; and
      determining, as part of using PDPC, a reference sample of the one or more reference samples based on the determined row and the determined x-coordinate,
   wherein determining, as part of using PDPC, the x-coordinate in the determined row comprises:
      determining, as part of using PDPC, one of a cotangent or tangent of the angle of the angular intra prediction mode; and
      determining, as part of using PDPC, the x-coordinate in the determined row based on one of the cotangent or tangent of the angle of the angular intra prediction mode, an x-coordinate of the prediction sample, and a y-coordinate of the prediction sample.

2. The method of claim 1, wherein determining one or more reference samples that are external to the current block comprises determining the one or more reference samples having at least one of an x-coordinate and a y-coordinate that is different than at least one of the respective x-coordinate and y-coordinate of the prediction sample in the prediction block.

3. The method of claim 1, wherein the x-coordinate in the determined row is based on an x-coordinate of the prediction sample and a y-coordinate of the prediction sample plus 1.

4. The method of claim 1, wherein the reference sample is a first reference sample of the one or more reference samples, and wherein determining one or more reference samples that are external to the current block further comprises:
   determining a column that is left of the current block;
   determining a y-coordinate in the determined column, wherein the y-coordinate in the determined column is based on an x-coordinate of the prediction sample and a y-coordinate of the prediction sample plus 1; and
   determining a second reference sample of the one or more reference samples based on the determined column and the determined y-coordinate.

5. A method of decoding video data, the method comprising:
- determining a prediction block, which includes a plurality of prediction samples, for a current block based on an angular intra prediction mode that is not a DC, planar, horizontal, or vertical intra prediction mode;
- modifying a prediction sample of the plurality of prediction samples of the prediction block to generate a modified prediction sample using Position Dependent Intra Prediction Combination (PDPC), wherein modifying the prediction sample comprises:
  - determining one or more reference samples that are external to the current block based on an angle of the angular intra prediction mode; and
  - modifying the prediction sample to generate the modified prediction sample based on the determined one or more reference samples; and
- reconstructing a sample of the current block based on the modified prediction sample and a residual value,
- wherein determining one or more reference samples that are external to the current block comprises:
  - determining, as part of using PDPC, a column that is left of the current block;
  - determining, as part of using PDPC, a y-coordinate in the determined column,
- wherein the y-coordinate in the determined column is based on the angle of the angular intra prediction mode; and
  - determining, as part of using PDPC, a reference sample of the one or more reference samples based on the determined column and the determined y-coordinate; and
- wherein determining, as part of using PDPC, the y-coordinate in the determined column comprises:
  - determining, as part of using PDPC, one of a cotangent or tangent of the angle of the angular intra prediction mode; and
  - determining, as part of using PDPC, the y-coordinate in the determined column based on one of the cotangent or tangent of the angle of the angular intra prediction mode, an x-coordinate of the prediction sample, and a y-coordinate of the prediction sample.

6. The method of claim 1, wherein determining one or more reference samples that are external to the current block based on the angular intra prediction mode comprises:
- determining a set of one or more samples based on the angular intra prediction mode; and
- at least one of interpolating, rounding with offset, or rounding without offset the set of one or more samples to generate the one or more reference samples.

7. The method of claim 1, wherein determining one or more reference samples that are external to the current block based on the angular intra prediction mode comprises:
- determining that one or more samples external to the current block identified based on the angular intra prediction mode are not stored in a reference line buffer; and
- determining the one or more reference samples based on a last reference sample stored in the reference line buffer.

8. The method of claim 1, wherein modifying the prediction sample of the prediction block comprises modifying a first prediction sample of the prediction block, and wherein the one or more reference samples comprise a first set of one or more reference samples, the method further comprising:
- determining, for a second prediction sample of the same prediction block, that at least one reference sample of a second set of one or more reference samples for the second prediction sample are not stored in a reference line buffer; and
- one of not applying PDPC to the second prediction sample or applying PDPC using only reference samples available in reference line buffer.

9. The method of claim 1, further comprising:
- determining a plurality of weights based on at least one of the x- and y-coordinates of the prediction sample,
- wherein modifying the prediction sample comprises modifying the prediction sample to generate the modified prediction sample based on the determined one or more reference samples, the determined weights, and the prediction sample.

10. A method of encoding video data, the method comprising:
- determining a prediction block, which includes a plurality of prediction samples, for a current block based on an angular intra prediction mode that is not a DC, planar, horizontal, or vertical intra prediction mode;
- modifying a prediction sample of the plurality of prediction samples of the prediction block to generate a modified prediction sample using Position Dependent Intra Prediction Combination (PDPC), wherein modifying the prediction sample comprises:
  - determining one or more reference samples that are external to the current block based on an angle of the angular intra prediction mode; and
  - modifying the prediction sample to generate the modified prediction sample based on the determined one or more reference samples;
- determining a residual value for a residual block based on the modified prediction sample and a sample value in the current block; and
- signaling information indicative of the residual value,
- wherein determining one or more reference samples that are external to the current block comprises:
  - determining, as part of using PDPC, a row that is above the current block;
  - determining, as part of using PDPC, an x-coordinate in the determined row,
- wherein the x-coordinate in the determined row is based on the angle of the angular intra prediction mode; and
  - determining, as part of using PDPC, a reference sample of the one or more reference samples based on the determined row and the determined x-coordinate,
- wherein determining, as part of using PDPC, the x-coordinate in the determined row comprises:
  - determining, as part of using PDPC, one of a cotangent or tangent of the angle of the angular intra prediction mode; and
  - determining, as part of using PDPC, the x-coordinate in the determined row based on one of the cotangent or tangent of the angle of the angular intra prediction mode, an x-coordinate of the prediction sample, and a y-coordinate of the prediction sample.

11. The method of claim 10, wherein determining one or more reference samples that are external to the current block comprises determining the one or more reference samples having at least one of an x-coordinate and a y-coordinate that is different than at least one of the respective x-coordinate and y-coordinate of the prediction sample in the prediction block.

12. The method of claim 10, wherein the x-coordinate in the determined row is based on an x-coordinate of the prediction sample and a y-coordinate of the prediction sample plus 1.

13. The method of claim 10, wherein the reference sample is a first reference sample of one or more reference samples, and wherein determining one or more reference samples that are external to the current block further comprises:
 determining a column that is left of the current block;
 determining a y-coordinate in the determined column, wherein the y-coordinate in the determined column is based on an x-coordinate of the prediction sample and a y-coordinate of the prediction sample plus 1; and
 determining a second reference sample of the one or more reference samples based on the determined column and the determined y-coordinate.

14. A method of encoding video data, the method comprising:
 determining a prediction block, which includes a plurality of prediction samples, for a current block based on an angular intra prediction mode that is not a DC, planar, horizontal, or vertical intra prediction mode;
 modifying a prediction sample of the plurality of prediction samples of the prediction block to generate a modified prediction sample using Position Dependent Intra Prediction Combination (PDPC), wherein modifying the prediction sample comprises:
  determining one or more reference samples that are external to the current block based on an angle of the angular intra prediction mode; and
  modifying the prediction sample to generate the modified prediction sample based on the determined one or more reference samples;
 determining a residual value for a residual block based on the modified prediction sample and a sample value in the current block; and
 signaling information indicative of the residual value,
 wherein determining one or more reference samples that are external to the current block comprises:
  determining, as part of using PDPC, a column that is left of the current block;
  determining, as part of using PDPC, a y-coordinate in the determined column,
 wherein the y-coordinate in the determined column is based on the angle of the angular intra prediction mode; and
  determining, as part of using PDPC, a reference sample of the one or more reference samples based on the determined column and the determined y-coordinate; and
 wherein determining, as part of using PDPC, the y-coordinate in the determined column comprises:
  determining, as part of using PDPC, one of a cotangent or tangent of the angle of the angular intra prediction mode; and
  determining, as part of using PDPC, the y-coordinate in the determined column based on one of the cotangent or tangent of the angle of the angular intra prediction mode, an x-coordinate of the prediction sample, and a y-coordinate of the prediction sample.

15. The method of claim 10, wherein determining one or more reference samples that are external to the current block based on the angular intra prediction mode comprises:
 determining a set of one or more samples based on the angular intra prediction mode; and
 at least one of interpolating, rounding with offset, or rounding without offset the set of one or more samples to generate the one or more reference samples.

16. The method of claim 10, wherein determining one or more reference samples that are external to the current block based on the angular intra prediction mode comprises:
 determining that one or more samples external to the current block identified based on the angular intra prediction mode are not stored in a reference line buffer; and
 determining the one or more reference samples based on a last reference sample stored in the reference line buffer.

17. The method of claim 10, wherein modifying the prediction sample of the prediction block comprises modifying a first prediction sample of the prediction block, and wherein the one or more reference samples comprise a first set of one or more reference samples, the method further comprising:
 determining, for a second prediction sample of the same prediction block, that at least one reference sample of a second set of one or more reference samples for the second prediction sample are not stored in a reference line buffer; and
 one of not applying PDPC to the second prediction sample or applying PDPC using only reference samples available in reference line buffer.

18. The method of claim 10, further comprising:
 determining a plurality of weights based on at least one of the x- and y-coordinates of the prediction sample,
 wherein modifying the prediction sample comprises modifying the prediction sample to generate the modified prediction sample based on the determined one or more reference samples, the determined weights, and the prediction sample.

19. A device for decoding video data, the device comprising:
 a memory configured to store a prediction block; and
 a video decoder comprising at least one of fixed-function or programmable circuitry, wherein the video decoder is configured to:
  determine the prediction block, which includes a plurality of prediction samples, for a current block, for storage in the memory, based an angle of on an angular intra prediction mode that is not a DC, planar, horizontal, or vertical intra prediction mode;
  modify a prediction sample of the plurality of prediction samples of the prediction block to generate a modified prediction sample using Position Dependent Intra Prediction Combination (PDPC), wherein to modify the prediction sample, the video decoder is configured to:
   determine one or more reference samples that are external to the current block based on the angular intra prediction mode; and
   modify the prediction sample to generate the modified prediction sample based on the determined one or more reference samples; and
  reconstruct a sample of the current block based on the modified prediction sample and a residual value,
 wherein to determine one or more reference samples that are external to the current block, the video decoder is configured to:
  determine, as part of using PDPC, a row that is above the current block;
  determine, as part of using PDPC, an x-coordinate in the determined row, wherein the x-coordinate in the determined row is based on the angle of the angular intra prediction mode; and
  determine, as part of using PDPC, a reference sample of the one or more reference samples based on the determined row and the determined x-coordinate, wherein to determine, as part of using PDPC, the x-coordinate in the determined row, the video decoder is configured to:
  determine, as part of using PDPC, one of a cotangent or tangent of the angle of the angular intra prediction mode; and
  determine, as part of using PDPC, the x-coordinate in the determined row based on one of the cotangent or tangent of the angle of the angular intra prediction mode, an x-coordinate of the prediction sample, and a y-coordinate of the prediction sample.

20. The device of claim 19, wherein to determine one or more reference samples that are external to the current block, the video decoder is configured to determine the one or more reference samples having at least one an x-coordinate and a y-coordinate that is different than at least one of the respective x-coordinate and y-coordinate of the prediction sample in the prediction block.

21. The device of claim 19, wherein the x-coordinate in the determined row is based on an x-coordinate of the prediction sample and a y-coordinate of the prediction sample plus 1.

22. The device of claim 19, wherein the reference sample is a first reference sample, and wherein to determine one or more reference samples that are external to the current block, the video decoder is configured to:
  determine a column that is left of the current block;
  determine a y-coordinate in the determined column, wherein the y-coordinate in the determined column is based on an x-coordinate of the prediction sample and a y-coordinate of the prediction sample plus 1; and
  determine a second reference sample of the one or more reference samples based on the determined column and the determined y-coordinate.

23. A device for decoding video data, the device comprising:
  a memory configured to store a prediction block; and
  a video decoder comprising at least one of fixed-function or programmable circuitry, wherein the video decoder is configured to:
    determine the prediction block, which includes a plurality of prediction samples, for a current block, for storage in the memory, based an angle of on an angular intra prediction mode that is not a DC, planar, horizontal, or vertical intra prediction mode;
    modify a prediction sample of the plurality of prediction samples of the prediction block to generate a modified prediction sample using Position Dependent Intra Prediction Combination (PDPC), wherein to modify the prediction sample, the video decoder is configured to:
      determine one or more reference samples that are external to the current block based on the angular intra prediction mode; and
      modify the prediction sample to generate the modified prediction sample based on the determined one or more reference samples; and
    reconstruct a sample of the current block based on the modified prediction sample and a residual value,
  wherein to determine one or more reference samples that are external to the current block, the video decoder is configured to:
    determine, as part of using PDPC, a column that is left of the current block;
    determine, as part of using PDPC, a y-coordinate in the determined column,
      wherein the y-coordinate in the determined column is based on the angle of the angular intra prediction mode; and
    determine, as part of using PDPC, a reference sample of the one or more reference samples based on the determined column and the determined y-coordinate
  wherein to determine the y-coordinate in the determined column, the video decoder is configured to:
    determine, as part of using PDPC, one of a cotangent or tangent of the angle of the angular intra prediction mode; and
    determine, as part of using PDPC, the y-coordinate in the determined column based on one of the cotangent or tangent of the angle of the angular intra prediction mode, an x-coordinate of the prediction sample, and a y-coordinate of the prediction sample.

24. The device of claim 19, wherein to determine one or more reference samples that are external to the current block based on the angular intra prediction mode, the video decoder is configured to:
  determine a set of one or more samples based on the angular intra prediction mode; and
  at least one of interpolate, round with offset, or round without offset the set of one or more samples to generate the one or more reference samples.

25. The device of claim 19, wherein to determine one or more reference samples that are external to the current block based on the angular intra prediction mode, the video decoder is configured to:
  determine that one or more samples external to the current block identified based on the angular intra prediction mode are not stored in a reference line buffer; and
  determine the one or more reference samples based on a last reference sample stored in the reference line buffer.

26. The device of claim 19, wherein to modify the prediction sample of the prediction block, the video decoder is configured to modify a first prediction sample of the prediction block, wherein the one or more reference samples comprise a first set of one or more reference samples, and wherein the video decoder is configured to:
  determine, for a second prediction sample of the same prediction block, that at least one reference sample of a second set of one or more reference samples for the second prediction sample are not stored in a reference line buffer; and
  one of not apply PDPC to the second prediction sample or apply PDPC using only reference samples available in reference line buffer.

27. The device of claim 19, wherein the video decoder is configured to:
  determine a plurality of weights based on at least one of the x- and y-coordinates of the prediction sample,
  wherein to modify the prediction sample, the video decoder is configured to modify the prediction sample to generate the modified prediction sample based on the determined one or more reference samples, the determined weights, and the prediction sample.

28. The device of claim 19, further comprising a display configured to display the current block.

29. The device of claim 19, wherein the device comprises one or more of a camera, a computer, a mobile device, a broadcast receiver device, or a set-top box.

30. A device for encoding video data, the device comprising:
a memory configured to store a prediction block; and
a video encoder comprising at least one of fixed-function or programmable circuitry, wherein the video encoder is configured to:
determine the prediction block, which includes a plurality of prediction samples, for a current block, for storage in the memory, based on an angular intra prediction mode that is not a DC, planar, horizontal, or vertical intra prediction mode;
modify a prediction sample of the plurality of prediction samples of the prediction block to generate a modified prediction sample using Position Dependent Intra Prediction Combination (PDPC), wherein to modify the prediction sample, the video encoder is configured to:
determine one or more reference samples that are external to the current block based on an angle of the angular intra prediction mode; and
modify the prediction sample to generate the modified prediction sample based on the determined one or more reference samples;
determine a residual value for a residual block based on the modified prediction sample and a sample value in the current block; and
signal information indicative of the residual value,
wherein to determine one or more reference samples that are external to the current block, the video encoder is configured to:
determine, as part of using PDPC, a row that is above the current block;
determine, as part of using PDPC, an x-coordinate in the determined row, wherein the x-coordinate in the determined row is based on the angle of the angular intra prediction mode; and
determine, as part of using PDPC, a reference sample of the one or more reference samples based on the determined row and the determined x-coordinate,
wherein to determine the x-coordinate in the determined row, the video encoder is configured to:
determine, as part of using PDPC, one of a cotangent or tangent of the angle of the angular intra prediction mode; and
determine, as part of using PDPC, the x-coordinate in the determined row based on one of the cotangent or tangent of the angle of the angular intra prediction mode, an x-coordinate of the prediction sample, and a y-coordinate of the prediction sample.

31. The device of claim 30, wherein to determine one or more reference samples that are external to the current block, the video encoder is configured to determine the one or more reference samples having at least one of an x-coordinate and a y-coordinate that is different than at least one of the respective x-coordinate and y-coordinate of the prediction sample in the prediction block.

32. The device of claim 30, wherein the x-coordinate in the determined row is based on an x-coordinate of the prediction sample and a y-coordinate of the prediction sample plus 1.

33. The device of claim 30, wherein the reference sample is a first reference sample of the one or more reference samples, and wherein to determine one or more reference samples that are external to the current block, the video encoder is configured to:

determine a column that is left of the current block;
determine a y-coordinate in the determined column, wherein the y-coordinate in the determined column is based on an x-coordinate of the prediction sample and a y-coordinate of the prediction sample plus 1; and
determine a second reference sample of the one or more reference samples based on the determined column and the determined y-coordinate.

34. The device of claim 30, A device for encoding video data, the device comprising:
a memory configured to store a prediction block; and
a video encoder comprising at least one of fixed-function or programmable circuitry, wherein the video encoder is configured to:
determine the prediction block, which includes a plurality of prediction samples, for a current block, for storage in the memory, based on an angular intra prediction mode that is not a DC, planar, horizontal, or vertical intra prediction mode;
modify a prediction sample of the plurality of prediction samples of the prediction block to generate a modified prediction sample using Position Dependent Intra Prediction Combination (PDPC), wherein to modify the prediction sample, the video encoder is configured to:
determine one or more reference samples that are external to the current block based on an angle of the angular intra prediction mode; and
modify the prediction sample to generate the modified prediction sample based on the determined one or more reference samples;
determine a residual value for a residual block based on the modified prediction sample and a sample value in the current block; and
signal information indicative of the residual value,
wherein to determine one or more reference samples that are external to the current block, the video encoder is configured to:
determine, as part of using PDPC, a column that is left of the current block;
determine, as part of using PDPC, a y-coordinate in the determined column,
wherein the y-coordinate in the determined column is based on the angle of the angular intra prediction mode; and
determine, as part of using PDPC, a reference sample of the one or more reference samples based on the determined column and the determined y-coordinate,
wherein to determine, as part of using PDPC, the y-coordinate in the determined column, the video encoder is configured to:
determine, as part of using PDPC, one of a cotangent or tangent of the angle of the angular intra prediction mode; and
determine, as part of using PDPC, the y-coordinate in the determined column based on one of the cotangent or tangent of the angle of the angular intra prediction mode, an x-coordinate of the prediction sample, and a y-coordinate of the prediction sample.

35. The device of claim 30, wherein to determine one or more reference samples that are external to the current block based on the angular intra prediction mode, the video encoder is configured to:
determine a set of one or more samples based on the angular intra prediction mode; and
at least one of interpolate, round with offset, or round without offset the set of one or more samples to generate the one or more reference samples.

36. The device of claim 30, wherein to determine one or more reference samples that are external to the current block based on the angular intra prediction mode, the video encoder is configured to:
- determine that one or more samples external to the current block identified based on the angular intra prediction mode are not stored in a reference line buffer; and
- determine the one or more reference samples based on a last reference sample stored in the reference line buffer.

37. The device of claim 30, wherein to modify the prediction sample of the prediction block, the video encoder is configured to modify a first prediction sample of the prediction block, wherein the one or more reference samples comprise a first set of one or more reference samples, and wherein the video encoder is configured to:
- determine, for a second prediction sample of the same prediction block, that at least one reference sample of a second set of one or more reference samples for the second prediction sample are not stored in a reference line buffer; and
- one of not apply PDPC to the second prediction sample or apply PDPC using only reference samples available in reference line buffer.

38. The device of claim 30, wherein the video encoder is configured to:
- determine a plurality of weights based on at least one of the on x- and y-coordinates of the prediction sample,
- wherein to modify the prediction sample, the video encoder is configured to modify the prediction sample to generate the modified prediction sample based on the determined one or more reference samples, the determined weights, and the prediction sample.

39. The device of claim 30, wherein the device comprises one or more of a camera, a computer, a mobile device, a broadcast receiver device, or a set-top box.

40. A computer-readable storage medium storing instructions that when executed cause one or more processors of a device for decoding video data to:
- determine a prediction block, which includes a plurality of prediction samples, for a current block based on an angular intra prediction mode that is not a DC, planar, horizontal, or vertical intra prediction mode;
- modify a prediction sample of the plurality of prediction samples of the prediction block to generate a modified prediction sample using Position Dependent Intra Prediction Combination (PDPC), wherein the instructions that cause the one or more processors to modify the prediction sample comprise instructions that cause the one or more processors to:
  - determine one or more reference samples that are external to the current block based on an angle of the angular intra prediction mode; and
  - modify the prediction sample to generate the modified prediction sample based on the determined one or more reference samples; and
- reconstruct a sample of the current block based on the modified prediction sample and a residual value,
- wherein the instructions that cause the one or more processors to determine one or more reference samples that are external to the current block comprise instructions that cause the one or more processors to:
  - determine, as part of using PDPC, a row that is above the current block;
  - determine, as part of using PDPC, an x-coordinate in the determined row, wherein the x-coordinate in the determined row is based on the angle of the angular intra prediction mode; and
  - determine, as part of using PDPC, a reference sample of the one or more reference samples based on the determined row and the determined x-coordinate,
- wherein the instructions that cause the one or more processors to determine, as part of using PDPC, the x-coordinate in the determined row comprise instructions that cause the one or more processors to:
  - determine, as part of using PDPC, one of a cotangent or tangent of the angle of the angular intra prediction mode; and
  - determine, as part of using PDPC, the x-coordinate in the determined row based on one of the cotangent or tangent of the angle of the angular intra prediction mode, an x-coordinate of the prediction sample, and a y-coordinate of the prediction sample.

41. A computer-readable storage medium storing instructions that when executed cause one or more processors of a device for encoding video data to:
- determine a prediction block, which includes a plurality of prediction samples, for a current block based on an angular intra prediction mode that is not a DC, planar, horizontal, or vertical intra prediction mode;
- modify a prediction sample of the plurality of prediction samples of the prediction block to generate a modified prediction sample using Position Dependent Intra Prediction Combination (PDPC), wherein the instructions that cause the one or more processors to modify the prediction sample comprise instructions that cause the one or more processors to:
  - determine one or more reference samples that are external to the current block based on an angle of the angular intra prediction mode; and
  - modify the prediction sample to generate the modified prediction sample based on the determined one or more reference samples;
- determine a residual value for a residual block based on the modified prediction sample and a sample value in the current block; and
- signal information indicative of the residual value,
- wherein the instructions that cause the one or more processors to determine one or more reference samples that are external to the current block comprise instructions that cause the one or more processors to:
  - determine, as part of using PDPC, a row that is above the current block;
  - determine, as part of using PDPC, an x-coordinate in the determined row, wherein the x-coordinate in the determined row is based on the angle of the angular intra prediction mode; and
  - determine, as part of using PDPC, a reference sample of the one or more reference samples based on the determined row and the determined x-coordinate,
- wherein the instructions that cause the one or more processors to determine, as part of using PDPC, the x-coordinate in the determined row comprise instructions that cause the one or more processors to:
  - determine, as part of using PDPC, one of a cotangent or tangent of the angle of the angular intra prediction mode; and
  - determine, as part of using PDPC, the x-coordinate in the determined row based on one of the cotangent or tangent of the angle of the angular intra prediction mode, an x-coordinate of the prediction sample, and a y-coordinate of the prediction sample.

42. A device for decoding video data, the device comprising:
- means for determining a prediction block, which includes a plurality of prediction samples, for a current block based on an angular intra prediction mode that is not a DC, planar, horizontal, or vertical intra prediction mode;
- means for modifying a prediction sample of the plurality of prediction samples in the prediction block to generate a modified prediction sample using Position Dependent Intra Prediction Combination (PDPC), wherein the means for modifying the prediction sample comprises:
  - means for determining one or more reference samples that are external to the current block based on an angle of the angular intra prediction mode; and
  - means for modifying the prediction sample to generate the modified prediction sample based on the determined one or more reference samples; and
- means for reconstructing a sample of the current block based on the modified prediction sample and a residual value,
- wherein the means for determining one or more reference samples that are external to the current block comprises:
  - means for determining, as part of using PDPC, a row that is above the current block;
  - means for determining, as part of using PDPC, an x-coordinate in the determined row, wherein the x-coordinate in the determined row is based on the angle of the angular intra prediction mode; and
  - means for determining, as part of using PDPC, a reference sample of the one or more reference samples based on the determined row and the determined x-coordinate,
- wherein the means for determining, as part of using PDPC, the x-coordinate in the determined row comprises:
  - means for determining, as part of using PDPC, one of a cotangent or tangent of the angle of the angular intra prediction mode; and
  - means for determining, as part of using PDPC, the x-coordinate in the determined row based on one of the cotangent or tangent of the angle of the angular intra prediction mode, an x-coordinate of the prediction sample, and a y-coordinate of the prediction sample.

43. A device for encoding video data, the device comprising:
- means for determining a prediction block, which includes a plurality of prediction samples, for a current block based on an angular intra prediction mode that is not a DC, planar, horizontal, or vertical intra prediction mode;
- means for modifying a prediction sample of the plurality of prediction samples of the prediction block to generate a modified prediction sample using Position Dependent Intra Prediction Combination (PDPC), wherein the means for modifying the prediction sample comprises:
  - means for determining one or more reference samples that are external to the current block based on an angle of the angular intra prediction mode; and
  - means for modifying the prediction sample to generate the modified prediction sample based on the determined one or more reference samples;
- means for determining a residual value for a residual block based on the modified prediction sample and a sample value in the current block; and
- means for signaling information indicative of the residual value,
- wherein the means for determining one or more reference samples that are external to the current block comprises:
  - means for determining, as part of using PDPC, a row that is above the current block;
  - means for determining, as part of using PDPC, an x-coordinate in the determined row, wherein the x-coordinate in the determined row is based on the angle of the angular intra prediction mode; and
  - means for determining, as part of using PDPC, a reference sample of the one or more reference samples based on the determined row and the determined x-coordinate,
- wherein the means for determining, as part of using PDPC, the x-coordinate in the determined row comprises:
  - means for determining, as part of using PDPC, one of a cotangent or tangent of the angle of the angular intra prediction mode; and
  - means for determining, as part of using PDPC, the x-coordinate in the determined row based on one of the cotangent or tangent of the angle of the angular intra prediction mode, an x-coordinate of the prediction sample, and a y-coordinate of the prediction sample.

44. The method of claim 1, wherein the determining, as part of the PDPC, one of the cotangent or tangent of the angle of the angular intra prediction mode is based on at least one value stored in a table.

45. The method of claim 5, wherein the determining, as part of the PDPC, one of the cotangent or tangent of the angle of the angular intra prediction mode is based on at least one value stored in a table.

* * * * *